United States Patent
Kobayashi et al.

(10) Patent No.: US 8,254,642 B2
(45) Date of Patent: Aug. 28, 2012

(54) PERSONAL AUTHENTICATION METHOD AND PERSONAL AUTHENTICATION DEVICE

(75) Inventors: Tsukasa Kobayashi, Saitama (JP); Shusuke Ichihara, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 884 days.

(21) Appl. No.: 12/309,689

(22) PCT Filed: Jun. 12, 2007

(86) PCT No.: PCT/JP2007/061808
§ 371 (c)(1),
(2), (4) Date: Jan. 27, 2009

(87) PCT Pub. No.: WO2008/013001
PCT Pub. Date: Jan. 31, 2008

(65) Prior Publication Data
US 2009/0207251 A1    Aug. 20, 2009

(30) Foreign Application Priority Data
Jul. 28, 2006  (JP) ................................ 2006-206976

(51) Int. Cl.
*G06K 9/00* (2006.01)
(52) U.S. Cl. ....................................................... 382/117
(58) Field of Classification Search ........... 382/115–118
See application file for complete search history.

(56) References Cited

U.S. PATENT DOCUMENTS

| | | | |
|---|---|---|---|
| 6,591,001 B1 * | 7/2003 | Oda et al. | 382/117 |
| 2001/0026632 A1 | 10/2001 | Tamai | |
| 2003/0152252 A1 * | 8/2003 | Kondo et al. | 382/117 |

FOREIGN PATENT DOCUMENTS

| | | |
|---|---|---|
| JP | 2001-273498 | 10/2001 |
| JP | 2004-030564 | 1/2004 |
| JP | 2006-031388 | 2/2006 |
| JP | 2006114018 A | 4/2006 |

* cited by examiner

*Primary Examiner* — Alex Liew
(74) *Attorney, Agent, or Firm* — Rabin & Berdo, P.C.

(57) ABSTRACT

A personal authentication method and device capable of creating iris information enabling personal authentication even if the iris image shows light reflection. The personal authentication device comprises an imaging section for imaging an eye of the user, an iris code generating section for generating an iris code from the captured image, a determining section for comparing the iris code with a registered iris code and determining whether or not the iris code agrees with the registered code, a control section for giving an instruction to retry imaging when there is no match, a guiding section for guiding the user so that the position where there is light reflection in the iris in retry-imaging changes, an average calculation image creating section for extracting an iris image from images, if the iris code generated from the image captured by retry-imaging disagrees with the registered iris code and creating an average calculation image produced by averaging the pixel values of the iris image, and an iris code generation instruction section for instructing the iris code generating section to generate an iris code from the average calculation image.

8 Claims, 12 Drawing Sheets

PERSONAL AUTHENTICATION METHOD AND PERSONAL AUTHENTICATION DEVICE

TECHNICAL FIELD

The present invention relates to a personal authentication method and a personal authentication device for authenticating the identity of a user by cross-checking of iris information, captured from a user against registered iris information a user has registered in advance, and in particular to a personal authentication method and personal authentication device with improved precision of identity authentication using iris information under external light, such as from sunlight or artificial light.

RELATED ART

Personal authentication devices using iris information are used in identity authentication for controlling entry and exit from research facilities, business premises, apartments etc., at gates at airports, in log-in systems for terminals, and other such applications. In such devices, if an iris is imaged under external light, such as sunlight, iris images are obtained that include pixels of brightness exceeding threshold values due to the reflection of the sunlight and the peripheral scene in the eye of the user. Consequently, when iris information generated from these iris images is cross-checked against registered iris information registered in advance, cross-check mismatches occur in a high proportion of cases even though the user is the genuine person. With regard to this, the above devices are often set so as to carry out retry-authentication one or more times when a cross-check mismatch is determined.

DISCLOSURE OF THE INVENTION

Problem to be Solved by the Invention

However, in the above devices, even if the eye (iris) of a user is imaged for retry-authentication, since the retry iris image also contains reflected light in the same manner, a cross-check mismatch occurs when iris information generated from the retry iris image is cross-checked against the above registered iris information.

In the light of the above circumstances, the present invention provides a personal authentication method and personal authentication device capable of generating iris information enabling personal authentication even when iris information includes reflected external light such as sunlight or reflections of the peripheral scene.

Method of Solving the Problem

The present invention adopts the following aspects in order to resolve the above issues.

<First Aspect>

A first aspect of the present invention provides a personal authentication device that includes, an imaging section for imaging a user's eye including the iris thereof, an iris code generating section for generating an iris code from the captured image, a determining section for comparing the generated iris code with a registered iris code stored in advance in a storage section and determining whether or not the iris code matches or does not match the registered code, a control section for giving an instruction to the imaging section to retry imaging when it is determined there is no match, the device including: a guiding section for guiding the user to a position where there is light reflection in the iris is different during retry-imaging; an average calculation image creating section for extracting an iris image representing the iris from a plurality of captured images if the iris code generated from the image captured by retry-imaging does not match the registered iris code, computing average values for the respective pixels of each of the iris images and creating an average calculation image of the computed average pixel values; and an iris code generation instruction section for instructing the iris code generating section to generate an iris code from the created average calculation image.

In the above aspect the control section instructs the imaging section to undertake retry-imaging a set number of times set in advance.

The control section, instructs the imaging section to carry out imaging plural times when in receipt of an instruction from a user for iris code registration. Also provided are an average calculation image creation instruction section for instructing the iris code generating section to generate an average calculation image from the plural captured images, and a storage section for storing a generated iris code in the storage section when an iris code is generated from the average calculation image.

The control section instructs the imaging section to carry out imaging for a pre-set number of times.

<Second Aspect>

A second aspect of the present invention provides a personal authentication method that includes, imaging a user's eye including the iris thereof with an imaging section, generating an iris code from the captured image, comparing the generated iris code with a registered iris code, determining whether or not the iris code matches or does not match the registered code, instructing the imaging section to carry out retry-imaging when it is determined there is no match, the method including: guiding the user to a position where there is light reflection in the iris is different during retry-imaging; extracting an iris image representing the iris from a plurality of captured images if the iris code generated from the image captured by retry-imaging does not match the registered iris code, computing the average pixel value for the respective pixels of each of the iris images, and creating an average calculation image of the average calculated pixel values; and instructing generation of an iris code from the created average calculation image.

In the above aspect, instruction is made to the imaging section to carry out imaging plural times when in receipt of an instruction to register an iris code from a user; instruction is made to create an average calculation image from the plural captured images; and when an iris code is generated from the average calculation image the generated iris code is stored in a storage section.

Instruction is made to the imaging section to undertake imaging a set number of times set in advance.

Effect of the Invention

According to the present invention, iris information is generated enabling personal authentication even if the iris image includes reflected light, such as from sunlight.

Explanation will now be given of details of exemplary embodiments of the present invention with reference to the drawings.

FIRST EXEMPLARY EMBODIMENT

<Configuration of the First Exemplary Embodiment>

Figure 1:
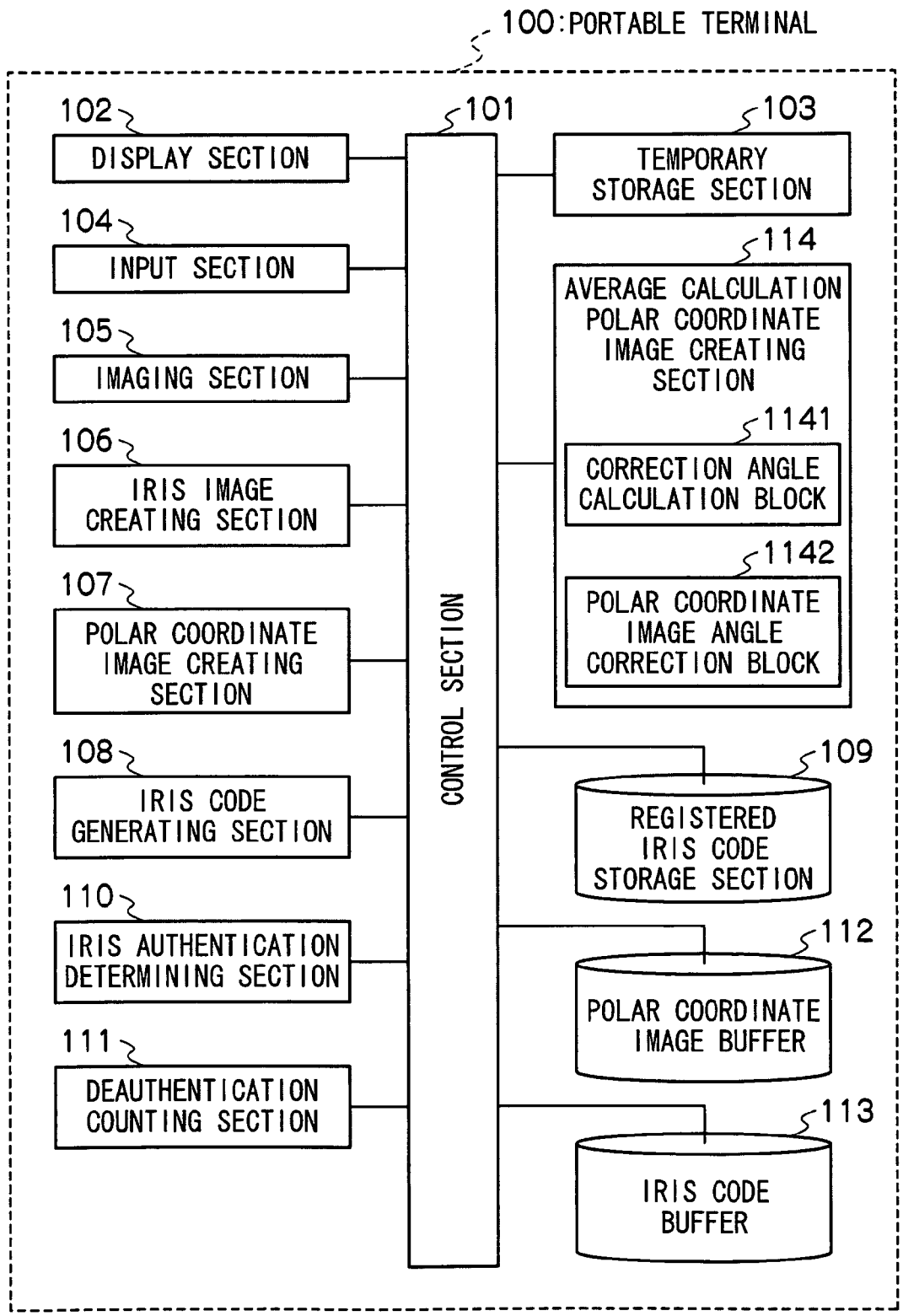
FIG. 1 is a block diagram showing a configuration of a portable terminal of a first exemplary embodiment of the present invention.
Figure 2:
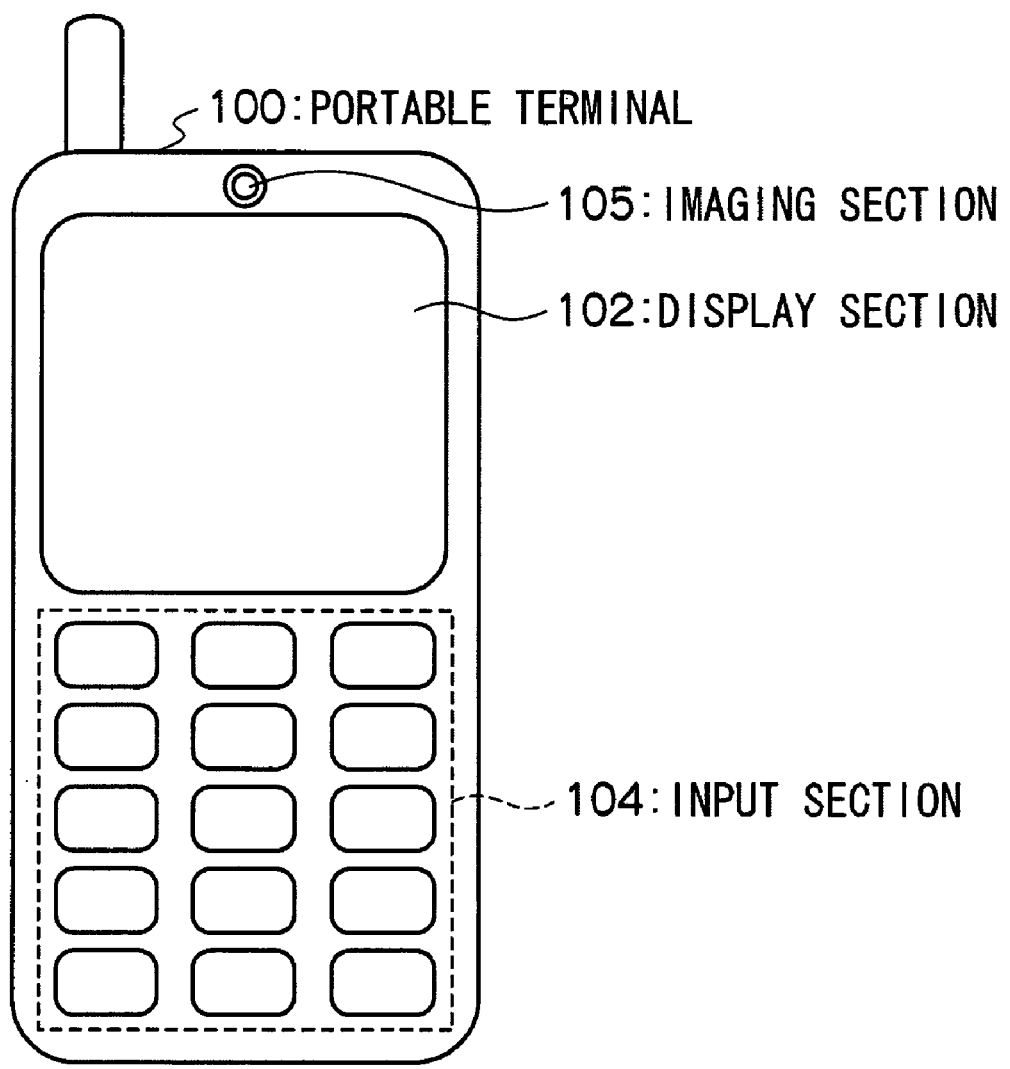
FIG. 2 is a diagram showing an example of the external appearance of a portable terminal according to the present invention.

The configuration of a portable terminal 100 is shown in FIG. 1 and FIG. 2, as an example of a personal authentication device according to the first exemplary embodiment of the present invention. The portable terminal 100 includes: a control section 101 for overall control of the portable terminal; a display section 102; a temporary storage section 103; an input section 104; an imaging section 105; an iris image creating section 106; a polar coordinate image creating section 107; an iris code generating section 108; a registered iris code storage section 109; an iris authentication determining section 110; a deauthentication counting section 111; a polar coordinate image buffer 112; an iris code buffer 113; and an average calculation polar coordinate image creating section 114, as shown in FIG. 1 and FIG. 2. The portable terminal 100 here is, for example, a mobile phone, with the mobile phone using iris authentication as a personal authentication section for logging into the mobile phone and for various procedures and processing with the mobile phone.

When a user switches a non-illustrated power supply of the portable terminal 100 ON, the control section 101 executes a non-illustrated memory control program, and since iris authentication of the user is required for logging into the portable terminal 100, imaging instruction message information is displayed on a display provided at the display section 102, instructing the user to image their eye using a camera.

Further, when a user inputs various procedure instructions using input button(s) provided at the input section 104, the control section 101 executes a non-illustrated memory control program, and since iris authentication of the user is required for procedure processing using the portable terminal 100, imaging instruction message information is displayed on a display provided at the display section 102, instructing the user to image their eye using a camera.

The user then, with reference to the imaging instruction message information or to later described retry-authentication instruction message information displayed on the display section 102, presses the imaging button provided at the input section 104 while looking into the camera provided at the imaging section 105, and the control section 101 instructs the imaging section 105 to capture an image.

When the imaging section 105 receives an instruction to carry out imaging, an imaging light provided at the imaging section 105 is made to flash, and the user is imaged by the camera provided at the imaging section 105. When the user is imaged by the imaging section 105, the control section 101 generates a captured image and the captured image is displayed on the display provided at the display section 102.

By reference to the above captured image, the user confirms that the captured image is an image including the user's eye, and presses an captured image confirmation button provided at the input section 104, and the control section 101 then instructs the iris image creating section 106 to create an iris image.

However, if the user has not included the user's eye in the above captured image, or if it is confirmed that the captured image is not sharp, then a captured image cancel button provided at the input section 104 is pressed, and the control section 101 executes a non-illustrated memory control program and the above imaging instruction message information is displayed on the display provided at the display section 102.

When in receipt of an instruction to create an iris image, the iris image creating section 106 extracts an image of the iris region from the above captured image, and the iris image is created. The iris image creating section 106 here clips the image of the iris region including the pupil from the above captured image, and extracts the pupil region from the clipped image, and creates an iris image showing an image of only the iris region. When the iris image creating section 106 creates the iris image, the control section 101 instructs the polar coordinate image creating section 107 to create a polar coordinate image.

When in receipt of the instruction to create the polar coordinate image, the polar coordinate image creating section 107 carries out coordinate system conversion to the above iris image for each pixel, and a polar coordinate image is created representing the position of pixels corresponded to the angle thereof. The polar coordinate image here, is an image in which the pixels at each position are represented with the angle of the iris region on the horizontal axis and the distance from the inside to the outside of the iris region on the vertical axis. When the polar coordinate image creating section 107 has created the polar coordinate image, the control section 101 stores the polar coordinate image in the temporary storage section 103 and instructs the iris code generating section 108 to generate the iris code.

When in receipt of an instruction to generate an iris code, the iris code generating section 108 divides up the above polar coordinate image or the later described average calculation polar coordinate image into an N×M grid (where N and M are arbitrary integers), calculates a characteristic amount for each of the grid squares, and generates an iris code with either 1 or 0 allocated to each of the characteristic amounts. When the iris code generating section 108 has generated the iris code, the control section 101 then stores the iris code in the temporary storage section 103, and also instructs the iris authentication determining section 110 to carry out iris authentication determining.

When in receipt of an instruction for iris authentication determining, the iris authentication determining section 110 cross-checks the above iris code against a registered iris code of the owner of the portable terminal 100, registered in advance and held in the registered iris code storage section 109, and determines whether they match or do not match. The iris authentication determining section 110 here compares the above iris code with the above registered iris code, shifts the iris code with respect to the registered iris code and detects the optimum shift amount representing the position at which the maximum proportion of 1s and 0s of bit strings in the two iris codes match, cross-checks the iris code shifted by the optimum shift amount against the registered iris code and determines if there is, or is not, a match.

When the iris authentication determining section 110 determines that there is a match, the control section 101 then permits the user to use the portable terminal 100 and to undertake processing for various procedures using the portable terminal 100.

However, if the iris authentication determining section 110 determines that there is no match, the control section 101 instructs the deauthentication counting section 111 to increment the count value.

The deauthentication counting section 111 is provided with functionality to count the number of times of deauthentication and to hold the count value, and when an instruction to increment is received the deauthentication counting section 111 increments the count value of the number of times of deauthentication.

When the count value of the deauthentication counting section 111 is 1, the control section 101 stores the polar coordinate image held in the temporary storage section 103 in the polar coordinate image buffer 112 as a polar coordinate image 1, and also stores the iris code held in the temporary storage section 103 as an iris code 1 in the iris code buffer 113.

When the control section 101 has stored the above polar coordinate image 1 and the iris code 1 in the polar coordinate image buffer 112 and the iris code buffer 113, the control section 101 generates retry-authentication instruction message information to inform the user to re-image their eye and carry out retry-authentication, and displays the retry-authentication instruction message information on the display provided at the display section 102. The retry-authentication instruction message information here includes an instruction to change the facing direction of the user and carry out imaging, in order to make the position of light reflection in the eye different to that at the first time of imaging.

When, with reference to the above retry-authentication instruction message information displayed on the display provided at the display section 102, the user carries out imaging for retry-authentication, a polar coordinate image 2 is generated in the polar coordinate image creating section 107 and an iris code 2 is generated in the iris code generating section 108 in the same manner as during the first authentication. The iris authentication determining section 110 compares the iris code 2 against the registered iris code held in the registered iris code storage section 109 and determines whether the two iris codes match or do not match.

If the count value of the deauthentication counting section 111 is 2 then the control section 101 instructs the average calculation polar coordinate image creating section to create an average calculation polar coordinate image.

The average calculation polar coordinate image creating section 114 aligns the iris positions of the previous polar coordinate image 1 held in the polar coordinate image buffer 112 and of the current polar coordinate image 2 held in the temporary storage section 103, and calculates average values for each pixel of the two polar coordinate images having different light reflection positions. The average calculation polar coordinate image creating section 114 is a section for creating an average polar coordinate image with reduced influence from brightness due to light reflection, and is configured with a correction angle calculation block 1141 and a polar coordinate image angle correction block 1142.

When in receipt of an instruction to create the average calculation polar coordinate image, the average calculation polar coordinate image creating section 114 instructs the correction angle calculation block 1141 to calculate a correction angle for aligning the iris position of the two polar coordinate images of the above polar coordinate image 1 and the above polar coordinate image 2.

When in receipt of an instruction to calculate the correction angle, the correction angle calculation block 1141 compares the iris code 1 held in the iris code buffer 113 against the iris code 2 held in the temporary storage section 103 and shifts the iris code 2 with respect to the iris code 1, detecting the optimum shift amount representing the position at which the maximum proportion of 1s and 0s in the bit strings from the two iris codes match, and calculates the correction angle corresponding to the optimum shift amount.

When the correction angle calculation block 1141 has calculated the correction angle, the average calculation polar coordinate image creating section 114 instructs the polar coordinate image angle correction block 1142 to correct the angle of the polar coordinate image 2 in order to align the iris position of the two polar coordinate images.

When in receipt of an instruction to correct the angle, the polar coordinate image angle correction block 1142 carries out angle correction of the polar coordinate image 2 held in the temporary storage section 103 based on the above calculated correction angle.

When the polar coordinate image angle correction block 1142 has carried out the angle correction of the above polar coordinate image 2, the average calculation polar coordinate image creating section 114 aligns the iris position of the polar coordinate image 1 held in the polar coordinate image buffer 112 and the above angle corrected polar coordinate image 2 and creates an average calculation polar coordinate image with the average calculated values for each pixel of the two polar coordinate images.

When the average calculation polar coordinate image creating section 114 has created the average calculation polar coordinate image, the control section 101 stores this average calculation polar coordinate image in the temporary storage section 103 and also instructs the iris code generating section 108 to generate an iris code.

If the count value of the deauthentication counting section 111 is 3, the control section 101 generates authentication not possible-message information in order to inform the user that retry-authentication did not match and that authentication is not possible, and displays the authentication not possible-message information on the display provided at the display section 102, completing the processing.

<Operation of the First Exemplary Embodiment>

Figure 3:
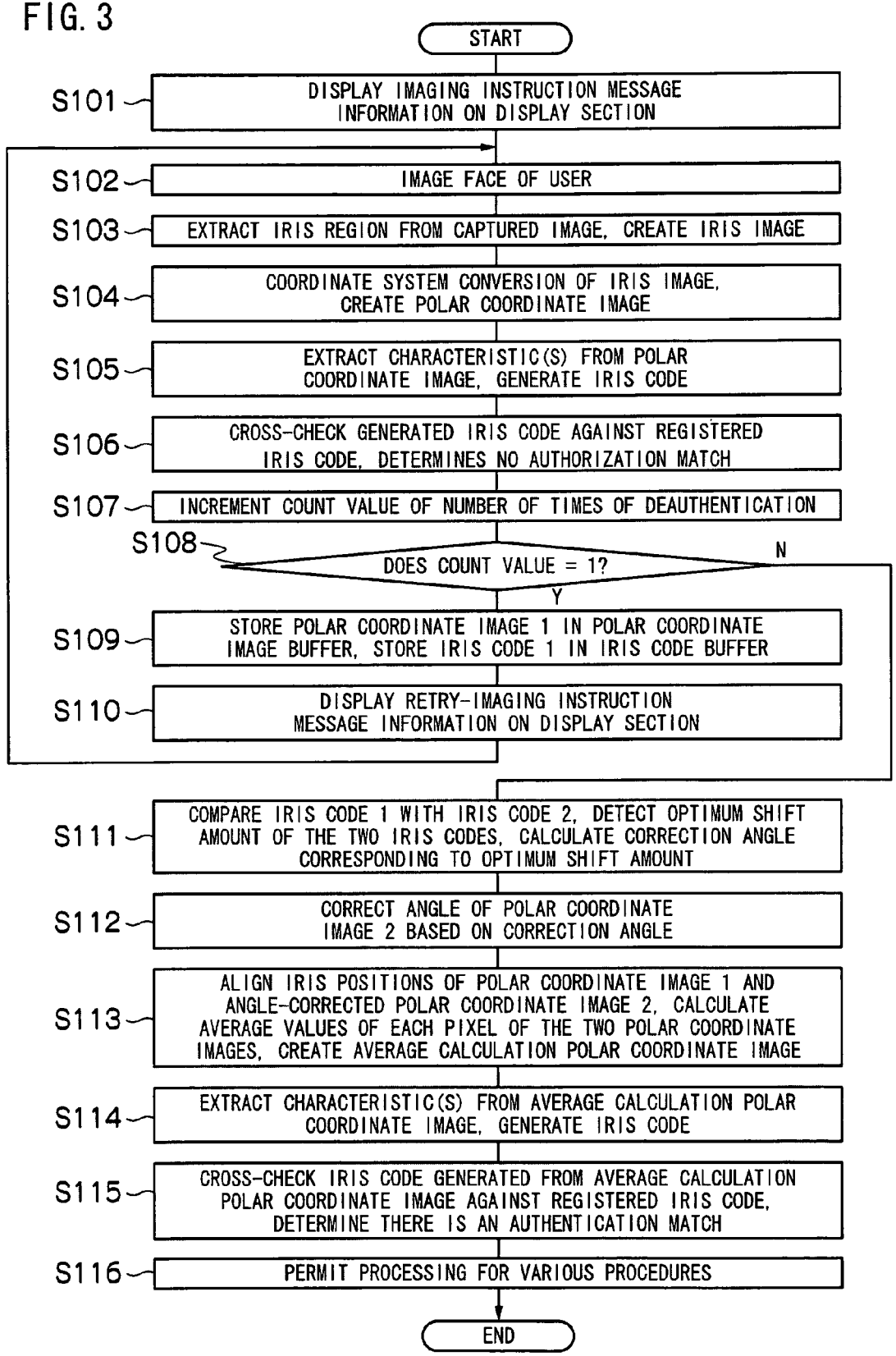
FIG. 3 is a flow chart showing the operation of a portable terminal of the first exemplary embodiment according to the present invention.

Explanation will now be given of the operation of the first exemplary embodiment of the portable terminal 100 of the present invention, with reference to the flow chart shown in FIG. 3. An example will be given of the portable terminal 100 being a mobile phone, with judgment that there is no authentication match the first time and at retry-authentication, however, the person is authenticated as being the genuine person in authentication using the average calculation polar coordinate image, and payment is made using an electronic payment function of the portable terminal 100.

When a user inputs a procedural instruction such as, for example, "ELECTRONIC PAYMENT" using input button(s) provided at the input section 104 of the portable terminal 100, the control section 101 executes a non-illustrated memory control program, and displays imaging instruction message information on the display provided at the display section 102 showing a message such as "UNDERTAKING IRIS AUTHENTICATION. PLEASE PHOTOGRAPH YOUR FACE USING THE CAMERA" in order to authenticate the identity of the user in the processing of the procedure for "ELECTRONIC PAYMENT" using the portable terminal 100 (step S101).

The user then, with reference to the above imaging instruction message information displayed on the display section 102, presses the imaging button provided at the input section 104 while looking into the camera provided at the imaging section 105, and the control section 101 instructs the imaging section 105 to carry out imaging.

When the imaging section 105 receives the instruction to carry out imaging the imaging light provided at the imaging section 105 flashes, and the user is imaged using the camera provided at the imaging section 105 (step S102). When the user is imaged by the imaging section 105 the control section 101 then creates a captured image and displays the captured image on the display provided at the display section 102.

The user confirms that the captured image is an image including the user's eye with reference to the above captured image, and presses a captured image confirmation button provided at the input section 104, and the control section 101 instructs the iris image creating section 106 to create an iris image.

When in receipt of an instruction to create an iris image, the iris image creating section 106 extracts an image of the iris region from the above captured image and creates the iris image 1 (step S103). When the iris image creating section 106 has created the iris image 1 the control section 101 instructs the polar coordinate image creating section 107 to create a polar coordinate image.

When in receipt of an instruction to create a polar coordinate image, the polar coordinate image creating section 107 converts the coordinates of each of the pixels of the above iris image 1 and creates the polar coordinate image 1 representing the position of the pixels corresponded to the angle (step S104). When the polar coordinate image creating section 107 has created the polar coordinate image 1, the control section 101 stores the polar coordinate image 1 in the temporary storage section 103 and also instructs the iris code generating section 108 to generate an iris code.

When in receipt of an instruction to generate an iris code, the iris code generating section 108 divides up the above polar coordinate image 1 into the N×M grid (where N and M are arbitrary integers), calculates a characteristic amount for each of the squares, and generates the iris code 1 by allocation of either 1 or 0 to each of the characteristic amounts (step S105). When the iris code generating section 108 has generated the iris code 1 the control section 101 stores this iris code 1 in the temporary storage section 103 and also instructs the iris authentication determining section 110 to carry out iris authentication determining.

When in receipt of an instruction to carry out iris authentication determining, the iris authentication determining section 110 cross-checks the above iris code 1 against a registered iris code of the owner of the portable terminal 100, registered in advance and stored in the registered iris code storage section 109, and determines whether there is, or is not, a match therebetween.

When the iris authentication determining section 110 determines that there is no match (step S106), the control section 101 instructs the deauthentication counting section 111 to increment the count value.

When in receipt of an instruction to increment the count, the deauthentication counting section 111 increments the count value of the number of times of deauthentication, making the count value=1 (step S107).

When the count value of the deauthentication counting section 111 is 1 (step S108), the control section 101 stores the polar coordinate image 1 held in the temporary storage section 103 in the polar coordinate image buffer 112 and also stores the iris code 1 held in the temporary storage section 103 in the iris code buffer 113 (step S109).

When the control section 101 has stored the above polar coordinate image 1 and iris code 1 in the polar coordinate image buffer 112 and the iris code buffer 113, the control section 101 also generates retry-authentication instruction message information to inform the user to re-image for retry-authentication, and displays a message, such as "NO AUTHENTICATION MATCH. CARRYING OUT RETRY-AUTHENTICATION, PLEASE CHANGE THE FACING DIRECTION OF YOUR BODY AND THEN PHOTOGRAPH YOUR EYE WITH THE CAMERA" as retry-authentication instruction message information on the display provided at the display section 102 (step S110).

When the user, with reference to the retry-authentication instruction message information displayed on the display section 102, has changed the facing direction of their body and pressed the imaging button provided at the input section 104 while facing the camera provided at the imaging section 105, the control section 101 instructs the imaging section 105 to carry out imaging.

When the imaging section 105 receives an instruction to carry out imaging the imaging section 105 images the user with the camera provided at the imaging section 105 (step S102). When the imaging section 105 has imaged the user the control section 101 creates a captured image and displays the captured image on the display provided at the display section 102.

When the user, with reference to the above captured image, presses the captured image confirmation button provided at the input section 104 to confirm that the captured image is an image including the user's eye, the control section 101 instructs the iris image creating section 106 to create an iris image.

When in receipt of an instruction to create an iris image, the iris image creating section 106 extracts an image the iris region from the above captured image and creates an iris image 2 (step S103). When the iris image creating section 106 has created the iris image 2, the control section 101 then instructs the polar coordinate image creating section 107 to create a polar coordinate image.

When in receipt of an instruction to create a polar coordinate image, the polar coordinate image creating section 107 creates a polar coordinate image 2 from the above iris image 2 (step S104). When the polar coordinate image creating section 107 has created the polar coordinate image 2, the control section 101 stores the polar coordinate image 2 in the temporary storage section 103 and also instructs the iris code generating section 108 to generate an iris code.

When in receipt of an instruction to generate an iris code, the iris code generating section 108 generates an iris code 2 from the above polar coordinate image 2 (step S105). When the iris code generating section 108 has created the iris code 2 the control section 101 then stores the iris code 2 in the temporary storage section 103 and instructs the iris authentication determining section 110 to carry out iris authentication determining.

When in receipt of an instruction to carry out iris authentication determining the iris authentication determining section 110 cross-checks the above iris code 2 against the registered iris code of the owner of the portable terminal 100, registered in advance and held in the registered iris code storage section 109, and determines whether there is, or is not, a match therebetween.

If the iris authentication determining section 110 determines that there is no match (step S106) then the control section 101 instructs the deauthentication counting section 111 to increment the count value.

When in receipt of an instruction to increment the count, the iris authentication determining section 110 increments the count value of the number of times of deauthentication making the count value=2 (step S107).

If the count value of the deauthentication counting section 111 is 2 (step S108) then the control section 101 instructs the average calculation polar coordinate image creating section 114 to create an average calculation polar coordinate image.

When in receipt of an instruction to create an average calculation polar coordinate image, the average calculation polar coordinate image creating section 114 instructs the correction angle calculation block 1141 to calculate the correction angle required to align the iris positions of the above polar coordinate image 1 and the above polar coordinate image 2.

When in receipt of an instruction to calculate the correction angle, the correction angle calculation block 1141 compares the iris code 1 held in the iris code buffer 113 against the iris code 2 held in the temporary storage section 103, shifts the iris code 2 with respect to the iris code 1, detects the optimum shift amount representing the position at which the maximum proportion of 1s and 0s in the bit strings from the two iris codes match, and calculates the correction angle corresponding to the optimum shift amount (step S111).

When the correction angle calculation block 1141 has calculated the correction angle, the average calculation polar coordinate image creating section 114 instructs the polar coordinate image angle correction block 1142 to correct the angle of the polar coordinate image 2 in order that the iris positions of the polar coordinate image 1 held in the polar coordinate image buffer 112 and the above polar coordinate image 2 are aligned.

When in receipt of the angle correction instruction, the polar coordinate image angle correction block 1142 carries out angle correction of the above polar coordinate image 2 based on the calculated correction angle (step S112).

When the polar coordinate image angle correction block 1142 has carried out angle correction to the above polar coordinate image 2, the average calculation polar coordinate image creating section 114 aligns the iris positions of the polar coordinate image 1 held in the polar coordinate image buffer 112 with that of the angle corrected polar coordinate image 2, and creates an average calculation polar coordinate image of the average calculated values for each of the pixels in both polar coordinate images having different light reflection positions (step S113).

When the average calculation polar coordinate image creating section 114 has created the average calculation polar coordinate image, the control section 101 stores the average calculation polar coordinate image in the temporary storage section 103 and also instructs the iris code generating section 108 to generate an iris code.

When in receipt of an instruction to generate an iris code, the iris code generating section 108 generates an iris code from the above average calculation polar coordinate image (step S114). When the iris code generating section 108 has generated the iris code, the control section 101 then stores the iris code in the temporary storage section 103 and also instructs the iris authentication determining section 110 to carry out iris authentication determining.

When in receipt of an instruction to carry out iris authentication determining, the iris authentication determining section 110 cross-checks the iris code generated from the above average calculation polar coordinate image against the registered iris code of the owner of the portable terminal 100, registered in advance and held in the registered iris code storage section 109, and determines whether there is, or is not, a match.

If the iris authentication determining section 110 determines that there is a match (step S115) then the control section 101 permits the user to use the portable terminal 100 and, for example, to carry out an electronic payment procedure using the portable terminal 100 (step S116).

<Effect of the First Exemplary Embodiment>

According to the portable terminal 100 of the first exemplary embodiment, even if iris region does not match the first time and on retry, an iris code can be generated enabling personal authentication of a user from an average calculation polar coordinate image, since the iris regions are aligned of the polar coordinate image 1 held in the polar coordinate image buffer 112 and of the polar coordinate image 2 held in the temporary storage section 103, and the average calculation polar coordinate image is created with reduced influence from light reflection with average calculated values for each of the pixels from these two polar coordinate images having different light reflection positions.

SECOND EXEMPLARY EMBODIMENT

<Configuration of Second Exemplary Embodiment>

The second exemplary embodiment is an exemplary embodiment in which the iris code buffer 113 provided at the portable terminal 100 of the first exemplary embodiment is not required, but with the addition of: an optimum shift amount detection section 115 for detecting the optimum shift amount of the iris code with respect to the registered iris code used for carryout out authentication determining in the iris authentication determining section 110; an optimum shift amount buffer 116 for storing the detected optimum shift amount 1 when the first time of authentication is not a match; and functionality for calculating the correction angle corresponding to the differential shift amount representing the difference between the optimum shift amount 1 first detected by the correction angle calculation block 1141 of the average calculation polar coordinate image creating section 114; and an optimum shift amount 2 detected during retry-authentication.

Figure 4:
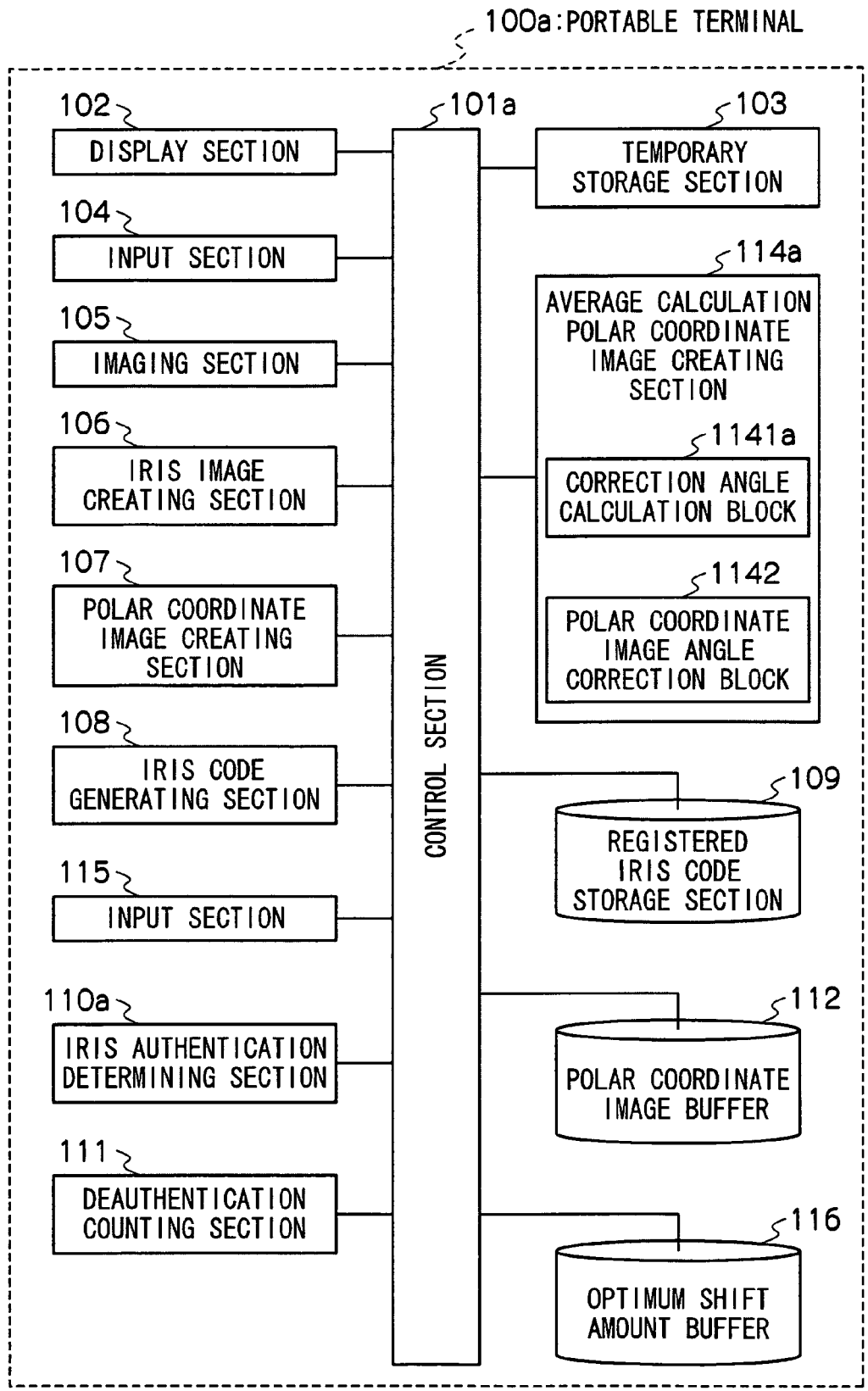
FIG. 4 is a block diagram showing a configuration of a portable terminal of a second exemplary embodiment according to the present invention.

The configuration of a portable terminal 100a is shown in FIG. 4 as an example of a personal authentication device according to the second exemplary embodiment of the present invention. The portable terminal 100a of the second exemplary embodiment of the present invention includes: a control section 101a for overall control of the terminal; a display section 102; a temporary storage section 103; an input section 104; an imaging section 105; an iris image creating section 106; a polar coordinate image creating section 107; an iris code generating section 108; a registered iris code storage section 109; an iris authentication determining section 110a; a deauthentication counting section 111; a polar coordinate image buffer 112; an average calculation polar coordinate image creating section 114a; the optimum shift amount detection section 115; and the optimum shift amount buffer 116, as shown in FIG. 4.

When the iris code generating section 108 has generated an iris code, the control section 101a stores the iris code in the temporary storage section 103 and also instructs the optimum shift amount detection section 115 to detect the optimum shift amount of the iris code with respect to the registered iris code, in order to cross-check the iris code held in the temporary storage section 103 with the iris code held in the registered iris code storage section 109.

When the optimum shift amount detection section 115 receives an instruction to detect the optimum shift amount, the optimum shift amount detection section 115 compares the above iris code against the registered iris code, and detects the optimum shift amount representing the shift of the iris code with respect to the registered iris code at which there is the greatest proportion of matches of 1s and 0s of the bit strings of the two iris codes.

When the optimum shift amount detection section 115 has detected the above optimum shift amount, the control section 101a stores the optimum shift amount in the temporary storage section 103 and also instructs the iris authentication determining section 110a to carry out iris authentication determining.

When the iris authentication determining section 110a receives an instruction to carry out iris authentication determining the iris authentication determining section 110a shifts the iris code held in the temporary storage section 103 by the above optimum shift amount, and cross-checks the shifted iris code against the registered iris code held in the registered iris code storage section 109, and determines if there is, or is not, a match.

If the count value of the deauthentication counting section 111 is 1 then the control section 101a stores the polar coordinate image held in the temporary storage section 103 as a polar coordinate image 1 in the polar coordinate image buffer 112, and also stores the optimum shift amount held in the temporary storage section 103 as an optimum shift amount 1 in the optimum shift amount buffer 116.

When the control section 101a has stored the above polar coordinate image 1 in the polar coordinate image buffer 112 and the optimum shift amount 1 in the optimum shift amount buffer 116, the control section 101a also generates retry-authentication instruction message information in order to inform the user to re-image for retry-authentication, and the retry-authentication instruction message information is displayed on the display provided at the display section 102.

Then the user, with reference to the above retry-authentication instruction message information displayed on the display provided at the display section 102, carries out re-imaging for retry-authentication, and in the same manner as during the first time of authentication, the polar coordinate image creating section 107 creates a polar coordinate image 2, and the optimum shift amount detection section 115 detects an optimum shift amount 2, the iris authentication determining section 110a compares the iris code 2 shifted by the optimum shift amount 2 against the registered iris code held in the registered iris code storage section 109, and carries out determining as to whether there is a match between the two codes, or no match.

If the count value of the deauthentication counting section 111 is 2, then the control section 101a instructs the average calculation polar coordinate image creating section 114a to create an average calculation polar coordinate image.

The average calculation polar coordinate image creating section 114a is configured with an correction angle calculation block 1141a and a polar coordinate image angle correction block 1142. When the average calculation polar coordinate image creating section 114a receives an instruction to create an average calculation polar coordinate image, the correction angle calculation block 1141a is instructed to calculate the correction angle required for aligning the iris positions of the two polar coordinate images of the above polar coordinate image 1 and the above polar coordinate image.

When in receipt of an instruction to calculate the correction angle, the correction angle calculation block 1141a calculates the differential shift amount representing the difference between the optimum shift amount 1 held in the optimum shift amount buffer 116 and the optimum shift amount 2 held in the temporary storage section 103, and calculates the correction angle corresponding to the differential shift amount.

When the correction angle calculation block 1141a has calculated the correction angle, the average calculation polar coordinate image creating section 114a instructs the polar coordinate image angle correction block 1142 to correct the angle of the polar coordinate image, in order that the iris positions of the two polar coordinate images are aligned.

Other portions of the configuration are the same as those of the portable terminal 100 of the first exemplary embodiment.

<Operation of the Second Exemplary Embodiment>

Figure 5:
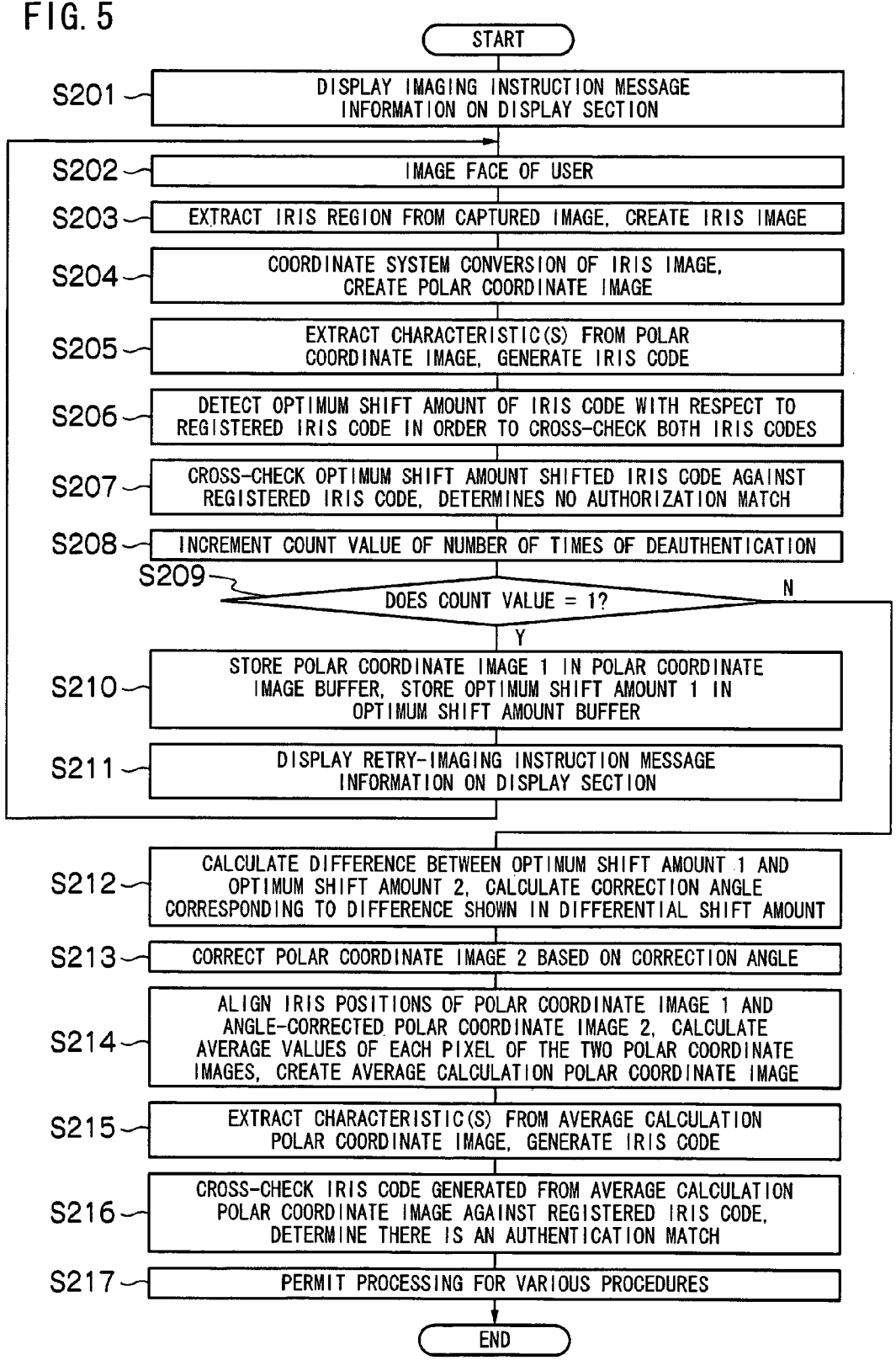
FIG. 5 is a flow chart showing the operation of a portable terminal of the second exemplary embodiment according to the present invention.

Explanation will now be given of the operation of the portable terminal 100a of the second exemplary embodiment according to the present invention, with reference to the flow chart shown in FIG. 5. An example will be given, in a similar manner to in the first exemplary embodiment, of the portable terminal 100a being a mobile phone, with judgment that there is no authentication match the first time and at retry-authentication, however, the person is authenticated as being the genuine person in authentication using the average calculation polar coordinate image, and payment is made using an electronic payment function of the portable terminal 100a.

The operation of the steps S201 to S205 of the second exemplary embodiment is the same as the operation of the steps S101 to S105 of the first exemplary embodiment.

When the iris code generating section 108 has generated the iris code, the control section 101a stores the iris code in the temporary storage section 103 and instructs the optimum shift amount detection section 115 to detect the optimum shift amount of the iris code with respect to the registered iris code.

When the optimum shift amount detection section 115 receives an instruction to detect the optimum shift amount, the optimum shift amount detection section 115 compares the above iris code with the registered iris code, held in the registered iris code storage section 109, and detects the optimum shift amount representing the shift of the iris code with respect to the registered iris code at which there is the greatest proportion of matches of 1s and 0s of the bit strings of the two iris codes (step S206).

When the optimum shift amount detection section 115 has detected the above optimum shift amount, the control section 101a stores the optimum shift amount in the temporary storage section 103 and instructs the iris authentication determining section 110a to carry out iris authentication determining.

When the iris authentication determining section 110a receives an instruction to carry out iris authentication determining the iris authentication determining section 110a shifts the iris code held in the temporary storage section 103 by the above optimum shift amount, cross-checks the shifted iris code against the registered iris code held in the registered iris code storage section 109, and determines whether there is, or is not, a match.

If the iris authentication determining section 110a determines that there is no match (step S207) then the control section 101a instructs the deauthentication counting section 111 to increment the count value.

When in receipt of an instruction to increment the deauthentication counting section 111 increments the count value of the number of times of deauthentication, making the count value=1 (step S208).

If the count value of the deauthentication counting section 111 is 1 (step S209) then the control section 101a stores the polar coordinate image held in the temporary storage section 103 as a polar coordinate image 1 in the polar coordinate image buffer 112, and also records the optimum shift amount held in the temporary storage section 103 as an optimum shift amount 1 in the optimum shift amount buffer 116 (step 210).

When the control section 101a has stored the above polar coordinate image 1 and optimum shift amount 1 in the polar coordinate image buffer 112 and the optimum shift amount buffer 116, the control section 101a generates retry-authentication instruction message information for informing the user to re-image for retry-authentication, and displays a message, such as "NO AUTHENTICATION MATCH. CARRYING OUT RETRY-AUTHENTICATION, PLEASE CHANGE THE FACING DIRECTION OF YOUR BODY AND THEN PHOTOGRAPH YOUR EYE WITH THE CAMERA" as retry-authentication instruction message information on the display provided at the display section 202 (step S211).

When the user, with reference to the retry-authentication instruction message information displayed on the display section 102, has carried out re-imaging for retry-authentication, the operations of steps S202 to S206 are carried out in the same manner as during initial authentication, the polar coordinate image creating section 107 creates a polar coordinate image 2, the optimum shift amount detection section 115 detects an optimum shift amount 2, the iris authentication determining section 110a compares the iris code 2 shifted by the optimum shift amount 2 against the registered iris code held in the registered iris code storage section 109, and determining is carried out as to whether there is a match between the two iris codes or no match.

When the iris authentication determining section 110a determines that there is no match (step S207), the control section 101a instructs the deauthentication counting section 111 to increment the count value.

When in receipt of an instruction to increment the count, the deauthentication counting section 111 increments the count value of the number of times of deauthentication, making the count value=2 (step S208).

If the count value of the deauthentication counting section 111 is 2 (step S209) then the control section 101a instructs the average calculation polar coordinate image creating section 114a to create a polar coordinate image.

When the average calculation polar coordinate image creating section 114a receives an instruction to create an average calculation polar coordinate image, the average calculation polar coordinate image creating section 114a instructs the correction angle calculation block 1141a to calculate the correction angle required to align the iris positions of the polar coordinate image 1 held in the polar coordinate image buffer 112 with the polar coordinate image held in the temporary storage section 103.

When in receipt of an instruction to calculate the correction angle, the correction angle calculation block 1141a calculates a differential shift amount representing the difference between the shift amount 1 held in the optimum shift amount buffer 116 and the optimum shift amount held in the temporary storage section 103, and calculates the correction angle corresponding to the differential shift amount (step S212).

When the correction angle calculation block 1141a has calculated the correction angle, the average calculation polar coordinate image creating section 114a instructs the polar coordinate image angle correction block 1142 to correct the angle of the polar coordinate image, in order to align the iris positions of both polar coordinate images.

The operation of steps S213 to S217 of the second exemplary embodiment are the same as the operations of steps S112 to S116 of the first exemplary embodiment.

<Effect of the Second Exemplary Embodiment>

According to the personal authentication device of the second exemplary embodiment, an optimum shift amount is detected for the above iris code and above registered iris code by the optimum shift amount detection section 115, and even if there is no match during initial authentication, the optimum shift amount 1 is stored in the optimum shift amount buffer 116, and if there is no match in retry-authentication, since a correction angle is computed by the correction angle calculation block 1141a of the average calculation polar coordinate image creating section 114a from the difference between the previous optimum shift amount 1 and the current optimum shift amount 2, processing to create an average calculation polar coordinate image can be carried out in a shorter period of time than in the personal authentication device of the first exemplary embodiment.

THIRD EXEMPLARY EMBODIMENT

<Configuration of Third Exemplary Embodiment>

The third exemplary embodiment is an exemplary embodiment in which the iris code buffer 113 provided at the portable terminal 100 of the first exemplary embodiment is not required. When there is no match during retry-authentication, in place of the correction angle calculation block 1141 of the average calculation polar coordinate image creating section 114, are provided: a polar coordinate image trend removal block 1143 for removing the trend (drift) in the respective pixels of the previous polar coordinate image 1 held in the polar coordinate image buffer 112 and the current polar coordinate image 2 held in the temporary storage section 103; and a correlation function use-correction angle calculation block 1144 for comparing the trend-removed two polar coordinate images using a correlation function and calculating a correction angle representing the angular misalignment between the two polar coordinate images in the position with the highest correlation coefficient that is the return value of the correlation function.

Figure 6:
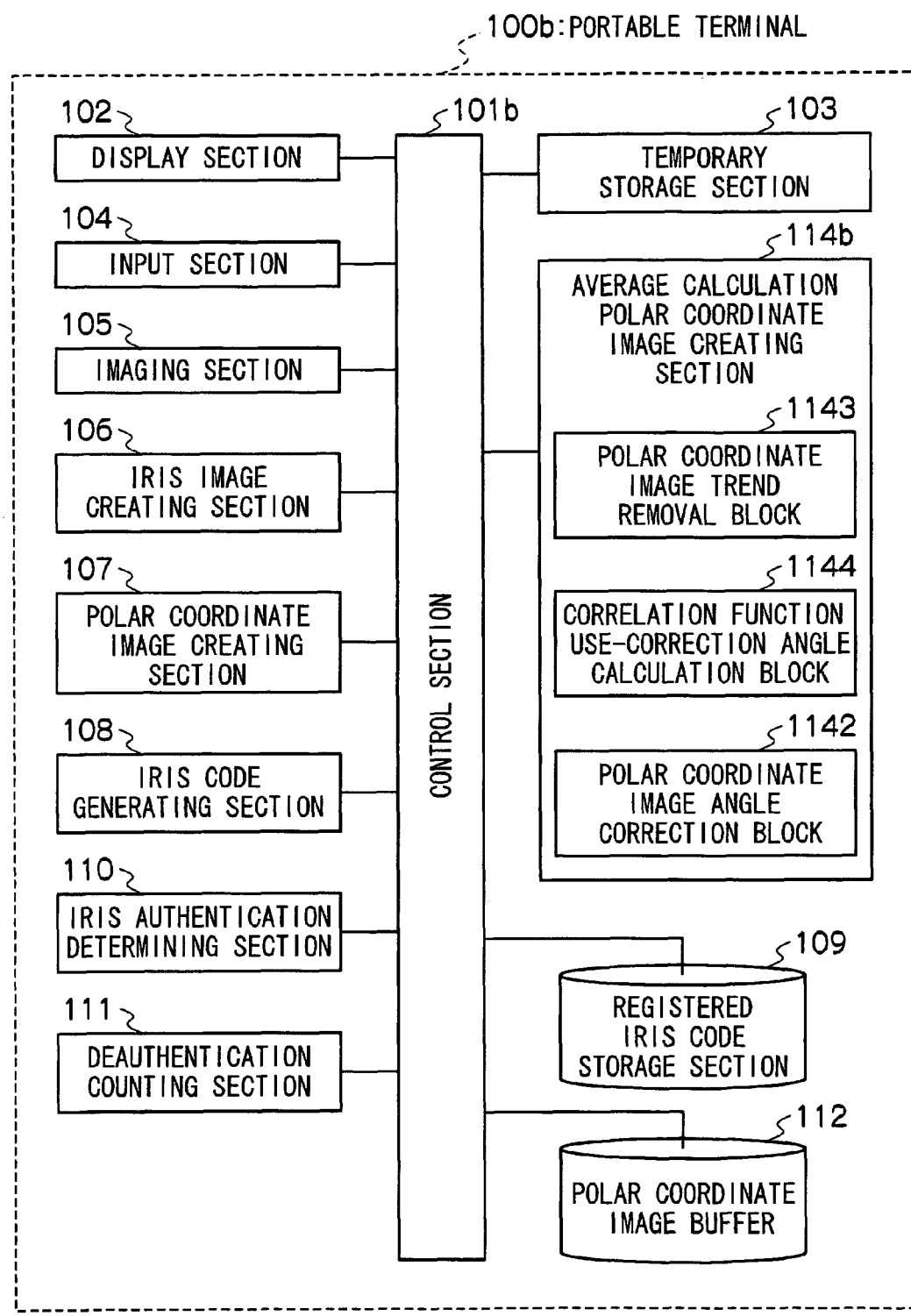
FIG. 6 is a block diagram showing a configuration of a portable terminal of a third exemplary embodiment according to the present invention.

The configuration of a portable terminal 100b is shown in FIG. 6 as an example of a personal authentication device according to the third exemplary embodiment of the present invention. The portable terminal 100b of the third exemplary embodiment of the present invention includes: a control section 101b for overall control of the terminal; a display section 102; a temporary storage section 103; an input section 104; an imaging section 105; an iris image creating section 106; a polar coordinate image creating section 107; an iris code generating section 108; a registered iris code storage section 109; an iris authentication determining section 110; a deauthentication counting section 111; a polar coordinate image buffer 112; and an average calculation polar coordinate image creating section 114b, as shown in FIG. 6.

If the count value of the deauthentication counting section 111 is 1, then the control section 101b stores the polar coordinate image 1 held in the temporary storage section 103 in the polar coordinate image buffer 112.

If the count value of the deauthentication counting section 111 is 2, then the control section 101b instructs the average calculation polar coordinate image creating section 114b to create an average calculation polar coordinate image.

The average calculation polar coordinate image creating section 114b is provided with the polar coordinate image angle correction block 1142, the polar coordinate image trend removal block 1143 and the correlation function use-correction angle calculation block 1144. When in receipt of an instruction to create an average calculation polar coordinate image, the average calculation polar coordinate image creating section 114b instructs the polar coordinate image trend removal block 1143 to remove the trend from each of the pixels of the previous polar coordinate image 1 held in the polar coordinate image buffer 112 and the current polar coordinate image 2 held in the temporary storage section 103.

When in receipt of an instruction to remove the trend, the polar coordinate image trend removal block 1143 removes the trend from each of the pixels in the above polar coordinate image 1 and polar coordinate image 2. Corrected values Z (x, y), with the trend removed of the brightness G (x, y) of a pixel at a given position (x, y) within the image are derived according to Expression 1 below.

$$Z(x, y) = ax + by + c \qquad \text{Expression 1}$$

$$a = \left(\sum_{y=0}^{H}\sum_{x=0}^{H}(x-i1)*G(x,y)\right) / WH / (i2 - i1*i1)$$

$$b = \left(\sum_{y=0}^{H}\sum_{x=0}^{H}(y-i1)*G(x,y)\right) / WH / (i2 - i1*i1)$$

Wherein:
W=image width
H=image height
WH=W*H
i1=(W−1)/2
i2=(W−1)*(2*W−1)/6

When the polar coordinate image trend removal block 1143 has removed the trend of each pixel of the above polar coordinate image 1 and polar coordinate image 2 using the above Expression 1, the average calculation polar coordinate image creating section 114b then instructs the correlation function use-correction angle calculation block 1144 to calculate the correction angle.

When in receipt of an instruction to calculate the correction angle, the correlation function use-correction angle calculation block 1144 compares the above trend-removed polar coordinate image 1 and polar coordinate image 2 using a correlation function and, by displacing the polar coordinate image 2 with respect to the polar coordinate image 1, detects the optimum displacement amount with the maximum value of the correlation coefficient that is the return value of the correlation function. If the pixel value series of the polar coordinate image 1 is A(n) and the pixel value series of the polar coordinate image 2 is B(n) then the correlation coefficient C(m), which is the return value of the correlation function when both polar coordinate images are displaced by an amount m, is derived according to the correlation function shown in Expression 2 below.

$$C(m) = \frac{\sum n[A(n) - \mu_A][B(n-m) - \mu_B]}{\sqrt{\sum n[A(n) - \mu_A]^2 \sum n[B(n) - \mu_B]^2}} \qquad \text{Expression 2}$$

$$\begin{cases} \mu_A = \frac{1}{N}\sum nA(n) \\ \mu_B = \frac{1}{N}\sum nB(n) \end{cases}$$

When the correlation function use-correction angle calculation block 1144 has compared the above two polar coordinate images, detected the optimum displacement amount m such that the value of the correlation coefficient C(m) is maximized, and has calculated the correction angle corresponding to the optimum displacement amount m, the average calculation polar coordinate image creating section 114b instructs the polar coordinate image angle correction block 1142 to correct the angle of the above polar coordinate image 2 in order to match the iris positions of the two polar coordinate images.

The other parts of the configuration are the same as those of the configuration of the portable terminal 100 of the first exemplary embodiment.

<Operation of the Third Exemplary Embodiment>

Figure 7:
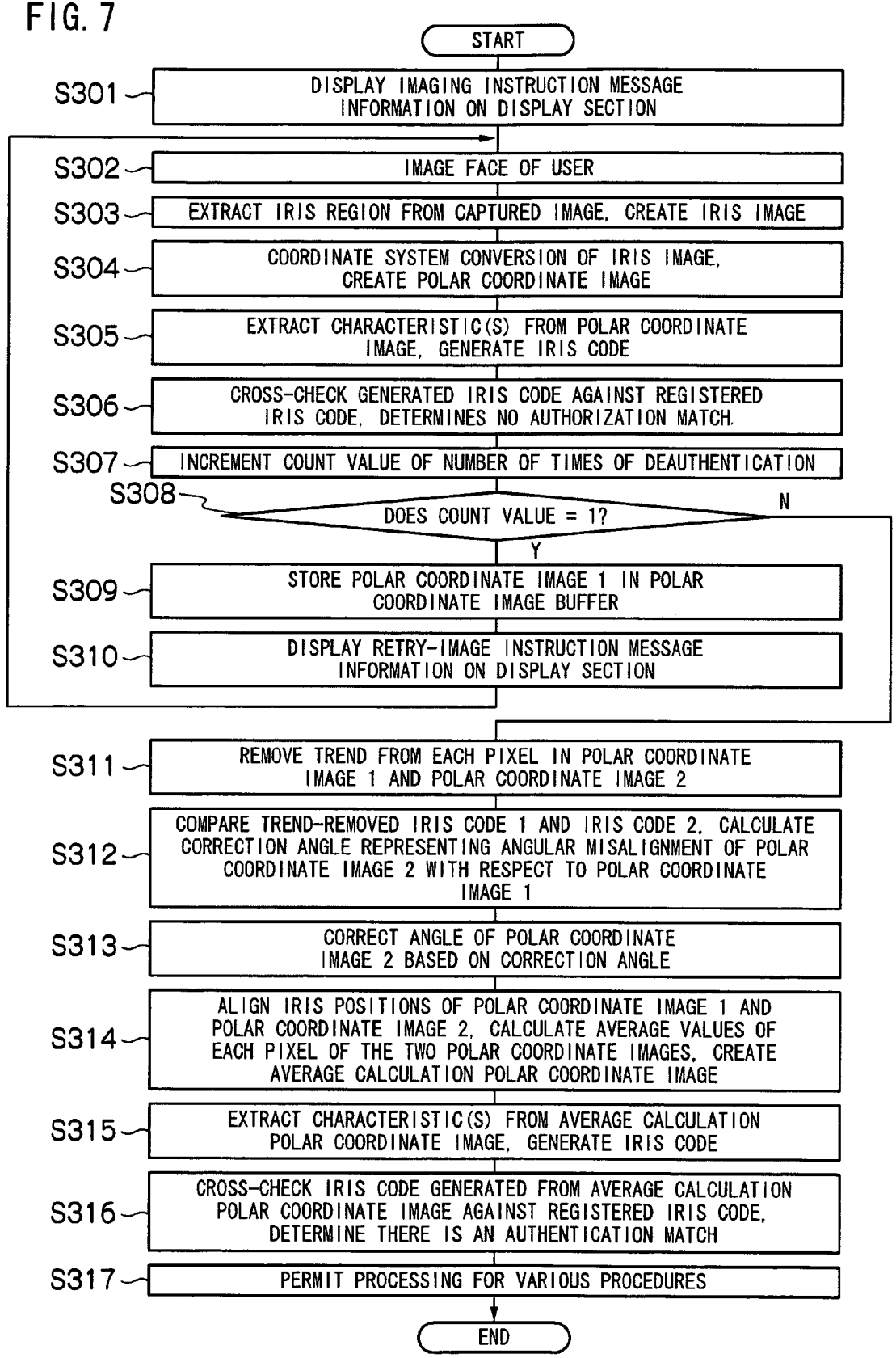
FIG. 7 is a flow chart showing the operation of a portable terminal of the third exemplary embodiment according to the present invention.

Explanation will now be given of the operation of the portable terminal 100b of the third exemplary embodiment according to the present invention, with reference to the flow chart shown in FIG. 7. An example will be given, in a similar manner to in the first exemplary embodiment, of the portable terminal 100b being a mobile phone, with judgment that there is no authentication match the first time and at retry-authentication, however, the person is authenticated as being the genuine person in authentication using the average calculation polar coordinate image, and payment is made using an electronic payment function of the portable terminal 100b.

The operation of steps S301 to S305 of the third exemplary embodiment are the same as those of steps S101 to S105 in the first exemplary embodiment.

When in receipt of an instruction to carry out iris authentication determining, the iris authentication determining section 110 cross-checks the iris code 1 held in the temporary storage section 103 against the registered iris code held in the registered iris code storage section 109 and determines if there is, or is not, a match.

If the iris authentication determining section 110 determines that there is no match (step S306) the control section 101b instructs the deauthentication counting section 111 to increment the count value.

When in receipt of an instruction to increment the deauthentication, counting section 111 increments the count value of the number of times of deauthentication, making the count value=1 (step S307).

If the count value of the deauthentication counting section 111 is 1 (step S308) then the control section 101b stores the polar coordinate image 1 held in the temporary storage section 103 in the polar coordinate image buffer 112 (step S309).

The control section 101b stores the above polar coordinate image 1 in the polar coordinate image buffer 112 and also generates retry-authentication instruction message information to inform the user to re-image for retry-authentication, and displays a message, such as "NO AUTHENTICATION MATCH. CARRYING OUT RETRY-AUTHENTICATION, PLEASE CHANGE THE FACING DIRECTION OF YOUR BODY AND THEN PHOTOGRAPH YOUR EYE WITH THE CAMERA" as retry-authentication instruction message information on the display provided at the display section 102 (step S310).

When the user has, with reference to the above retry-authentication instruction message information displayed on the display provided at the display section 102, carried out imaging for retry-authentication, then the operation of steps S302 to S305 are carried out in a similar manner to during initial authentication. The polar coordinate image creating section 107 creates a polar coordinate image 2, and the iris authentication determining section 110 compares the iris code 2 with the registered iris code held in the registered iris code storage section 109, and determines whether the two iris codes match or do not match.

If the iris authentication determining section 110b determines that there is no match (step S306) the control section 101b instructs the deauthentication counting section 111 to increment the count value.

When in receipt of an instruction to increment, the deauthentication counting section 111 increments the count value of the number of times of deauthentication, making the count value=2 (step S307).

If the count value of the deauthentication counting section 111 is 2 (step S308) then the control section 101b instructs the average calculation polar coordinate image creating section 114b to create a polar coordinate image.

When in receipt of an instruction to create an average calculation polar coordinate image, the average calculation polar coordinate image creating section 114b instructs the polar coordinate image trend removal block 1143 to remove the trend from the previous polar coordinate image 1 held in the polar coordinate image buffer 112 and the current polar coordinate image 2 held in the temporary storage section 103.

When in receipt of an instruction to remove the trend, the polar coordinate image trend removal block 1143 removes the trend from each pixel in the above polar coordinate image 1 and polar coordinate image 2 (step S311).

When the polar coordinate image trend removal block 1143 has removed the trend from each pixel of the above polar coordinate image 1 and polar coordinate image 2, the average calculation polar coordinate image creating section 114b instructs the correlation function use-correction angle calculation block 1144 to calculate a correction angle.

When in receipt of an instruction to calculate a correction angle, the correlation function use-correction angle calculation block 1144 compares the above trend-removed polar coordinate image 1 and polar coordinate image 2 using a correlation function, and by displacing the polar coordinate image 2 with respect to the polar coordinate image 1, detects the optimum displacement amount to give the maximum value of the correlation coefficient that is the return value of the correlation function, and calculates the correction angle corresponding to this optimum displacement amount (step S312).

When the correlation function use-correction angle calculation block 1144 has calculated the correction angle, the average calculation polar coordinate image creating section 114b then instructs the polar coordinate image angle correction block 1142 to correct the angle of the above polar coordinate image 2.

The operation of steps S313 to S317 of the third exemplary embodiment is the same as the operation of steps S112 to S116 of the first exemplary embodiment.

<Effect of the Third Exemplary Embodiment>

According to the personal authentication device of the third exemplary embodiment, the correlation function use-correction angle calculation block 1144 of the average calculation polar coordinate image creating section 114b compares the above polar coordinate image 1 and the above polar coordinate image 2 using a correlation function, and can calculate a correction angle of the polar coordinate image 1 with respect to the polar coordinate image 1, and so processing to create the average calculation polar coordinate image can be carried out in a shorter period of time than in the personal authentication device of the second exemplary embodiment.

FOURTH EXEMPLARY EMBODIMENT

<Configuration of the Fourth Exemplary Embodiment>

The fourth exemplary embodiment is an embodiment with the functionality, additional to that of the portable terminal 100 of the first exemplary embodiment, of: receiving an iris code registration instruction from a user; and, when the registration instruction is received from the user, taking two images of the user's eye with the imaging section 105, with different facing directions of the user in each of the image captures, and the average calculation polar coordinate image creating section 114 creating average calculation polar coordinate system based on the two images and storing an iris code from the created average calculation polar coordinate image as the registered iris code in the registered iris code storage section 109.

Figure 8:
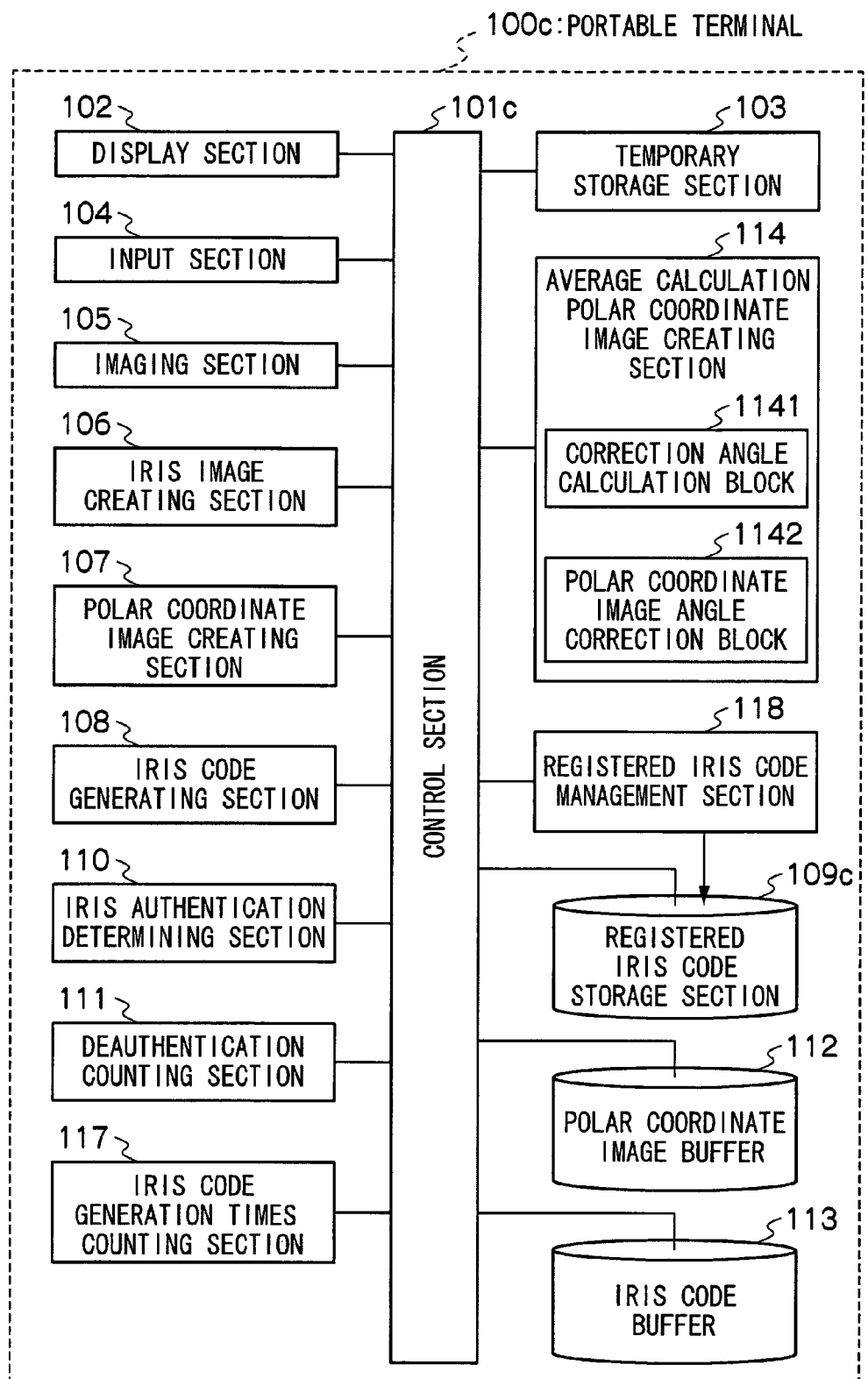
FIG. 8 is a block diagram showing a configuration of a portable terminal of a fourth exemplary embodiment according to the present invention.

The configuration of a portable terminal 100c is shown in FIG. 8, as an example of a personal authentication device according to the fourth exemplary embodiment of the present invention. The portable terminal 100c of the fourth exemplary embodiment of the present invention includes: a control section 101c for overall control of the terminal; a display section 102; a temporary storage section 103; an input section 104; an imaging section 105; an iris image creating section 106; a polar coordinate image creating section 107; an iris code generating section 108; a registered iris code storage section 109c; an iris authentication determining section 110; a deauthentication counting section 111; a polar coordinate image buffer 112; an iris code buffer 113; and an average calculation polar coordinate image creating section 114; an iris code generation times counting section 117; and a registered iris code management section 118, as shown in FIG. 8.

When a user inputs an iris code registration instruction using input button(s) provided at the input section 104, the portable terminal 100c executes a non-illustrated memory control program and displays imaging instruction message information on the display provided at the display section 102, instructing imaging of a user's eye with the camera in order to carry out iris code generation for the user.

The user then, with reference to the imaging instruction message information or to later described retry-imaging instruction message information displayed on the display section 102, presses the imaging button provided at the input section 104 while looking into the camera provided at the imaging section 105, and the control section 101c instructs the imaging section 105 to capture an image.

When the iris code generating section 108 has generated an iris code, the control section 101c stores the iris code in the temporary storage section 103 and also instructs the iris code generation times counting section 117 to increment the count value.

If the count value of the iris code generation times counting section 117 is 1, the control section 101c stores the polar coordinate image 1 held in the temporary storage section 103 in the polar coordinate image buffer 112 and also stores the iris code 1 held in the temporary storage section 103 in the iris code buffer 113.

As well as storing the above polar coordinate image 1 and iris code 1 in the polar coordinate image buffer 112 and the iris code buffer 113, the control section 101c also executes a non-illustrated memory control program and displays retry-imaging instruction message information on the display provided at the display section 102 to inform the user to re-image their eye. The retry-imaging instruction message information includes an instruction for the user to image with a different facing direction of their body to that of the initial imaging.

The user, with reference to the above retry-imaging instruction message information displayed on the display provided at the display section 102, carries out retry-imaging, and in the same manner as in the initial imaging, the polar coordinate image creating section 107 creates a polar coordinate image 2 and the iris code generating section 108 generates an iris code 2. In addition, when the iris code generating section 108 has generated the iris code 2, the control section 101c stores the iris code 2 in the temporary storage section 103 and also instructs the iris code generation times counting section 117 to increment the count value.

If the count value of the iris code generation times counting section 117 is 2, the control section 101c instructs the average calculation polar coordinate image creating section 114 to create an average calculation polar coordinate image.

The average calculation polar coordinate image creating section 114 creates the average calculation polar coordinate image based on the above polar coordinate image 1 and polar coordinate image 2, and the iris code generating section 108 generates an iris code from the average calculation polar coordinate image, the control section 101c stores the iris code 2 in the temporary storage section 103 and also instructs the iris code generation times counting section 117 to increment the count value.

If the count value of the iris code generation times counting section 117 is 3, the control section 101c instructs the registered iris code management section 118 to carry out iris code registration, since the iris code held in the iris code generating section 108 is the iris code generated from the average calculation polar coordinate image.

When the registered iris code management section 118 receives an instruction for iris code registration, the registered iris code management section 118 stores the iris code held in the temporary storage section 103, as the registered iris code, in the registered iris code storage section 109c.

When the registered iris code management section 118 has newly registered the iris code the control section 01c generates registration complete message information to inform the user that registration of the iris code has been completed, and displays the registration complete message information on the display provided at the display section 102.

Other parts of the configuration are the same as in the configuration of the portable terminal 100 of the first exemplary embodiment.

<Operation of the Fourth Exemplary Embodiment>

Figure 9:
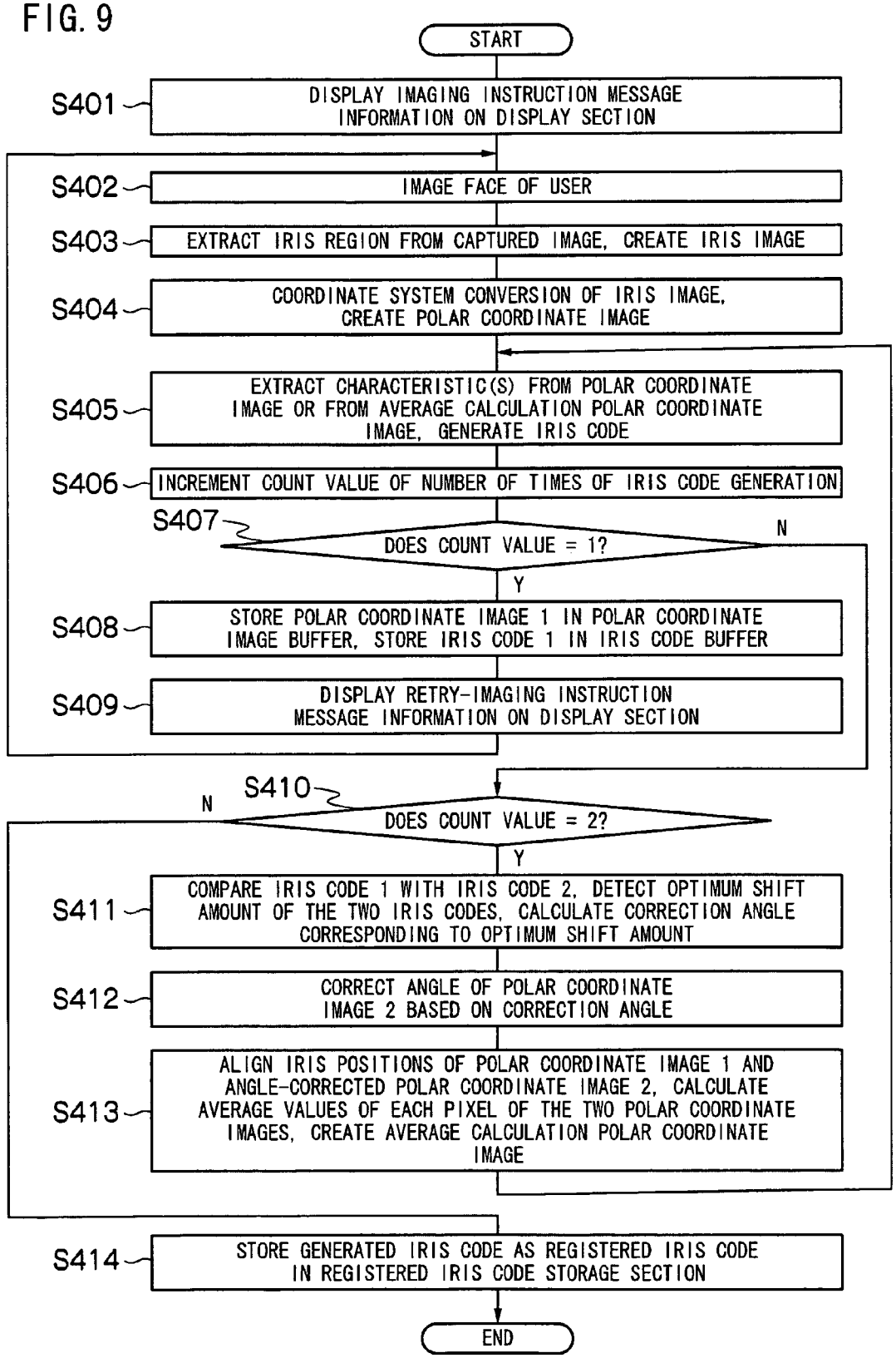
FIG. 9 is a flow chart showing the operation of a portable terminal of the fourth exemplary embodiment according to the present invention.

Explanation will now be given of the operation of the portable terminal 100c of the fourth exemplary embodiment according to the present invention, with reference to the flow chart shown in FIG. 9. An example will be given, in a similar manner to in the first exemplary embodiment, of the portable terminal 100c being a mobile phone, and carrying out iris code registration for authenticating that the user is the genuine person. The operation of the iris authentication in the control section 101c is the same as the operation in the portable terminal 100 explained in the first exemplary embodiment, and further explanation will be omitted.

When the user inputs an iris code registration instruction using the input button provided at the input section 104, the control section 101c executes a non-illustrated memory control program and displays imaging instruction message information showing a message, such as "CARRYING OUT IRIS AUTHENTICATION. PLEASE PHOTOGRAPH YOUR FACE WITH THE CAMERA" on the display provided at the display section 102 (step S401).

The user, with reference to the above imaging instruction message information displayed on the display section 102, presses the imaging button provided at the input section 104 while looking into the camera provided at the imaging section 105, and then the control section 101c instructs the imaging section 105 to capture an image.

Operation of the steps S402 to S405 of the fourth exemplary embodiment are the same as the operation of steps S102 to S105 in the first exemplary embodiment.

When the iris code generating section 108 has generated an iris code, the control section 101c stores the iris code in the temporary storage section 103 and also instructs the iris code generation times counting section 117 to increment the count value.

When the iris code generation times counting section 117 receives an instruction to increment, the iris code generation times counting section 117 increments the count value of the number of times of iris code generation, making the count value=1 (step S406).

If the count value of the iris code generation times counting section 117 is 1 (step S407), the control section 101c stores the polar coordinate image 1 held in the temporary storage section 103 in the polar coordinate image buffer 112 and also stores the iris code 1 held in the temporary storage section 103 in the iris code buffer 113 (step S408).

The control section 101c stores the above polar coordinate image 1 and iris code 1 in the polar coordinate image buffer 112 and the iris code buffer 113 and also executes a non-illustrated memory control program, and retry-imaging instruction message information including a message, for example "CARRYING OUT RETRY-IMAGING, PLEASE CHANGE YOUR BODY FACING DIRECTION AND PHOTOGRAPH YOUR EYE WITH THE CAMERA" on the display provided at the display section 102 (step S409).

The user then carries out retry-imaging with reference to the above retry-imaging instruction message information displayed on the display provided at the display section 102, and operations of steps S402 to S405 are carried out in the same manner as during initial imaging, and the iris code generating section 108 generates an iris code 2.

When the iris code generating section 108 has generated the iris code 2, the control section 101c stores the iris code 2 in the temporary storage section 103 and also instructs the iris code generation times counting section 117 to increment the count value.

When the iris code generation times counting section 117 receives an instruction to increment, the iris code generation times counting section 117 increments the count value of the number of times of iris code generation, making the count value=2 (step S406).

If the count value of the iris code generation times counting section 117 is 2 (step S407, S410), the control section 101c instructs the average calculation polar coordinate image creating section 114 to create an average calculation polar coordinate image.

Operation of steps S411 to S413 of the fourth exemplary embodiment are the same as the operation of steps S111 to S113 of the first exemplary embodiment.

When the iris code generating section 108 has generated an iris code from the average calculation iris code registration instruction created by the average calculation polar coordinate image creating section 114, the control section 101c stores the iris code in the temporary storage section 103 and also instructs the iris code generation times counting section 117 to increment the count value.

When the iris code generation times counting section 117 receives an instruction to increment, the iris code generation times counting section 117 increments the count value of the number of times of iris code generation, making the count value=3 (step S406).

If the count value of the iris code generation times counting section 117 is 3 (step S407, S410), the control section 101c instructs the registered iris code management section 118 to carry out iris code registration, since the iris code held in the temporary storage section 103 is the iris code generated from the average calculation polar coordinate image.

When the registered iris code management section 118 receives an instruction to carry out iris code registration, the registered iris code management section 118 stores the above iris code at the registered iris code in the registered iris code storage section 109c (step S414).

When the registered iris code management section 118 has newly registered the iris code the control section 01c executes an non-illustrated memory control program and generates registration complete message information for the user showing a message such as "IRIS CODE REGISTRATION COMPLETED." on the display provided at the display section 102.

<Effect of the Fourth Exemplary Embodiment>

According to the personal authentication device of the fourth exemplary embodiment, the average calculation polar coordinate image creating section 114 creates the average calculation polar coordinate image from two polar coordinate images created by imaging the eye of the user twice, and high precision authentication determining is carried out using a registered iris code with reduced influence from light reflection by storing the iris code generated from the average calculation polar coordinate image as the registered iris code in the registered iris code storage section 109c.

FIFTH EXEMPLARY EMBODIMENT

<Configuration of the Fifth Exemplary Embodiment>

The fifth exemplary embodiment is an embodiment that, in place of the retry-authentication instruction message information instructing the user to change the direction of their face and carry out imaging in retry-imaging of the portable terminal 100 of the first exemplary embodiment, such that the position of light reflection in their eye is different to that the first time, there is additional functionality provided at create an sight line guidance-image for display on the display provided at display an icon for sight line guidance on the display section 102, so that the sight line of the user is different each time of imaging.

Figure 10:
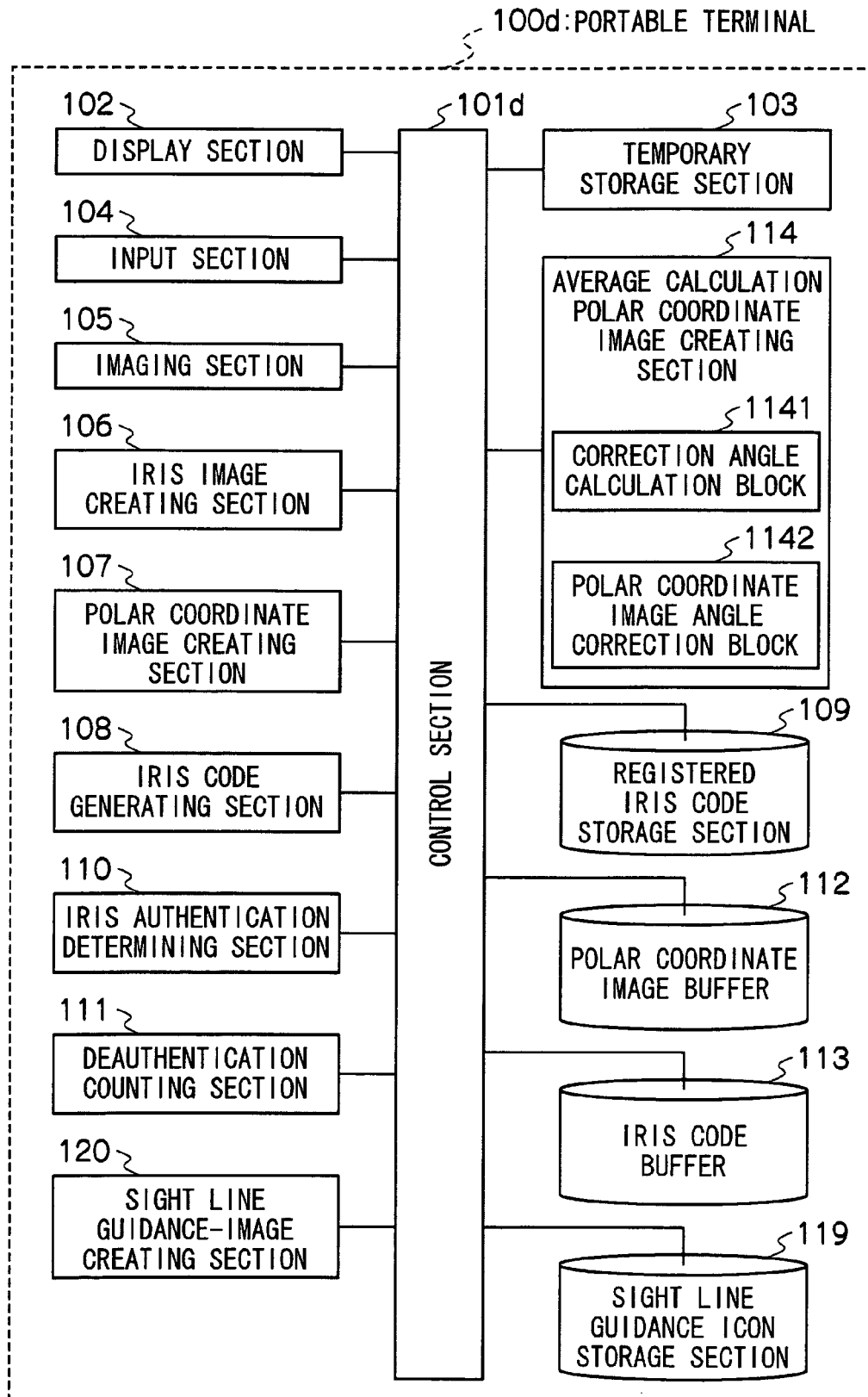
FIG. 10 is a block diagram showing a configuration of a portable terminal of a fifth exemplary embodiment according to the present invention.

The configuration of a portable terminal 100d is shown in FIG. 10, as an example of a personal authentication device according to the fifth exemplary embodiment of the present invention. The portable terminal 100d of the fifth exemplary embodiment of the present invention includes: a control section 101d for overall control of the terminal; a display section 102; a temporary storage section 103; an input section 104; an imaging section 105; an iris image creating section 106; a polar coordinate image creating section 107; an iris code generating section 108; a registered iris code storage section 109; an iris authentication determining section 110; a deauthentication counting section 111; a polar coordinate image buffer 112; an iris code buffer 113; and an average calculation polar coordinate image creating section 114; a sight line guidance icon storage section 119; and a sight line guidance-image creating section 120, as shown in FIG. 10.

The sight line guidance icon storage section 119 uses later described sight line guidance-image building to display on the display, provided at the display section 102, during the first time of imaging and in retry-imaging in order that the sight line of a user is different each time of imaging, and stores an icon for sight line guidance. The icon for sight line guidance is configured, for example, with a combination of a shape such as a circle, a diamond or the like, in order to focus the sight line of the user, and an arrow for guiding the user in the direction of the shape.

When in receipt of an instruction to create a later described screen for imaging, the sight line guidance-image creating section 120 acquires the icon for sight line guidance 1 for use in the first time of imaging from the sight line guidance icon storage section 119 and also acquires sight line guidance imaging instruction information for use in the first time of imaging, which had been stored in advance in a non-illustrated memory. The sight line guidance-image creating section 120 creates a sight line guidance-image 1 based on the icon for sight line guidance 1 and the sight line guidance imaging instruction information.

However, when in receipt of an instruction to create a later described screen for retry-imaging, the sight line guidance-image creating section 120 acquires an icon for sight line guidance 2 for use in retry-imaging from the sight line guidance icon storage section 119 and also acquires retry sight line guidance imaging instruction information for use in retry-imaging, which had been stored in advance in a non-illustrated memory. The sight line guidance-image creating section 120 creates a sight line guidance-image 2 based on the icon for sight line guidance 2 and the retry sight line guidance imaging instruction information.

When a user switches the non-illustrated power supply of the portable terminal 100 ON, the control section 101d instructs the sight line guidance-image creating section 120 to create a screen for imaging in order to display to the user an icon for sight line guidance to guide the sight line of a user on the display provided at the display section 102.

When the user inputs an instruction for various procedures using input button(s) provided at the input section 104, the control section 101d instructs the sight line guidance-image creating section 120 to create a screen for imaging.

If the value of the deauthentication counting section 111 is 1 then the control section 101d stores the polar coordinate image 1 held in the temporary storage section 103 in the polar coordinate image buffer, and also stores the iris code 1 held in the temporary storage section 103 in the iris code buffer 113.

The control section 101d stores the polar coordinate image 1 and the iris code 1 in the polar coordinate image buffer 112 and the iris code buffer 113 and also instructs the sight line guidance-image creating section 120 to create a screen for retry-imaging in order to display to the user an icon for sight line guidance, to guide the sight line of the user so that the sight line is different from that during the first time of imaging, on the display provided at the display section 102.

Figure 11A:
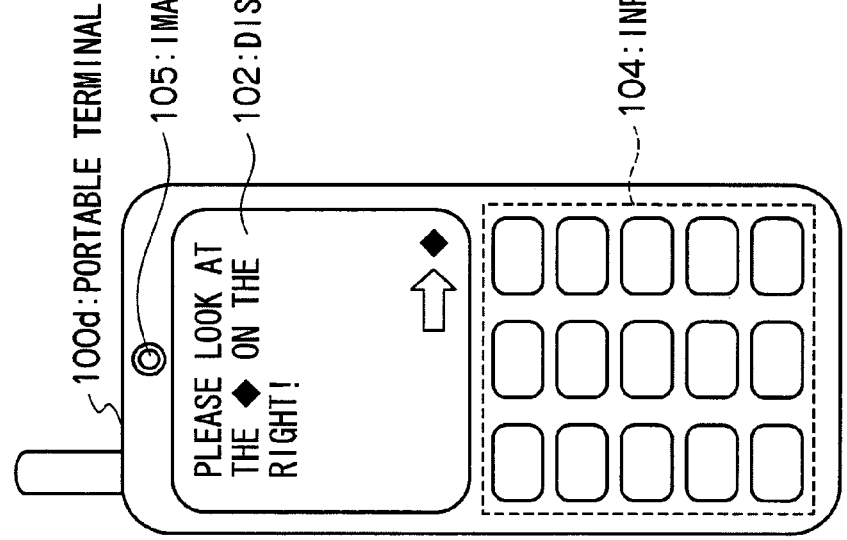
FIG. 11A is a diagram showing an example of a sight line guidance-image displayed on a display section of the fifth exemplary embodiment according to the present invention.
Figure 11B:
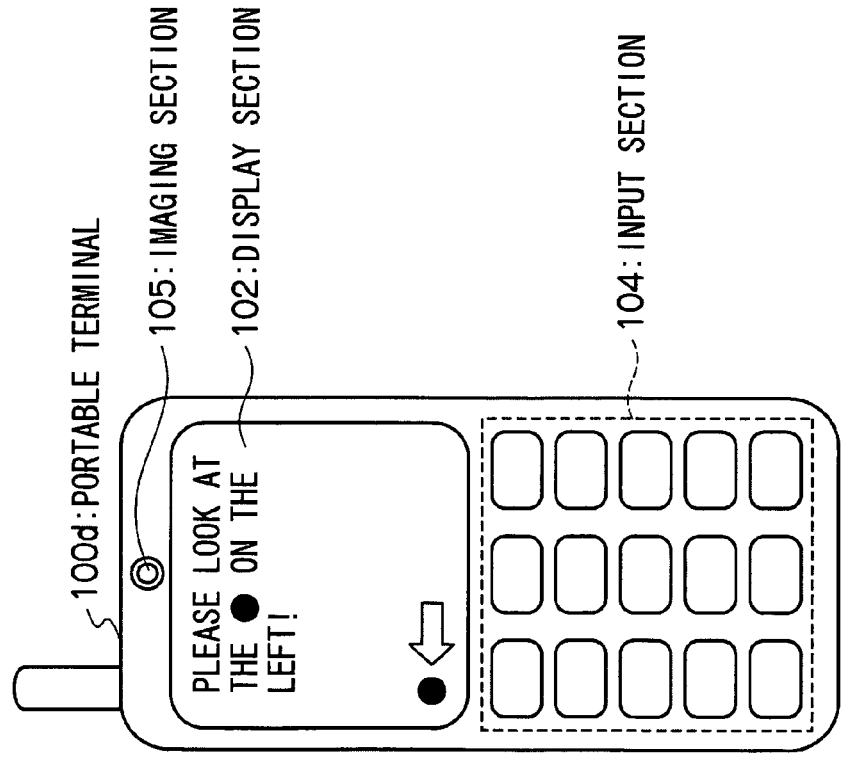
FIG. 11B is a diagram showing an example of a sight line guidance-image displayed on the display section of the fifth exemplary embodiment according to the present invention.

When the sight line guidance-image creating section 120 has created the above polar coordinate image 1 and polar coordinate image 2, the control section 101d displays the polar coordinate image 1 and the polar coordinate image 2 on the display provided at the display section 102. Examples of the sight line guidance-image displayed on the display section 102 of the portable terminal 100d are shown in FIG. 11A and FIG. 11B. FIG. 11A shows an example of the sight line guidance-image 1 displayed on the display section 102, and FIG. 11B shows and example of the sight line guidance-image 2 displayed on the display section 102.

If the value of the deauthentication counting section 111 is 2 then the control section 101d instructs the average calculation polar coordinate image creating section 114 to create an average calculation polar coordinate image.

The other parts of the configuration are the same as those of the configuration of the portable terminal 100 of the first exemplary embodiment.

<Operation of the Fifth Exemplary Embodiment>

Figure 12:
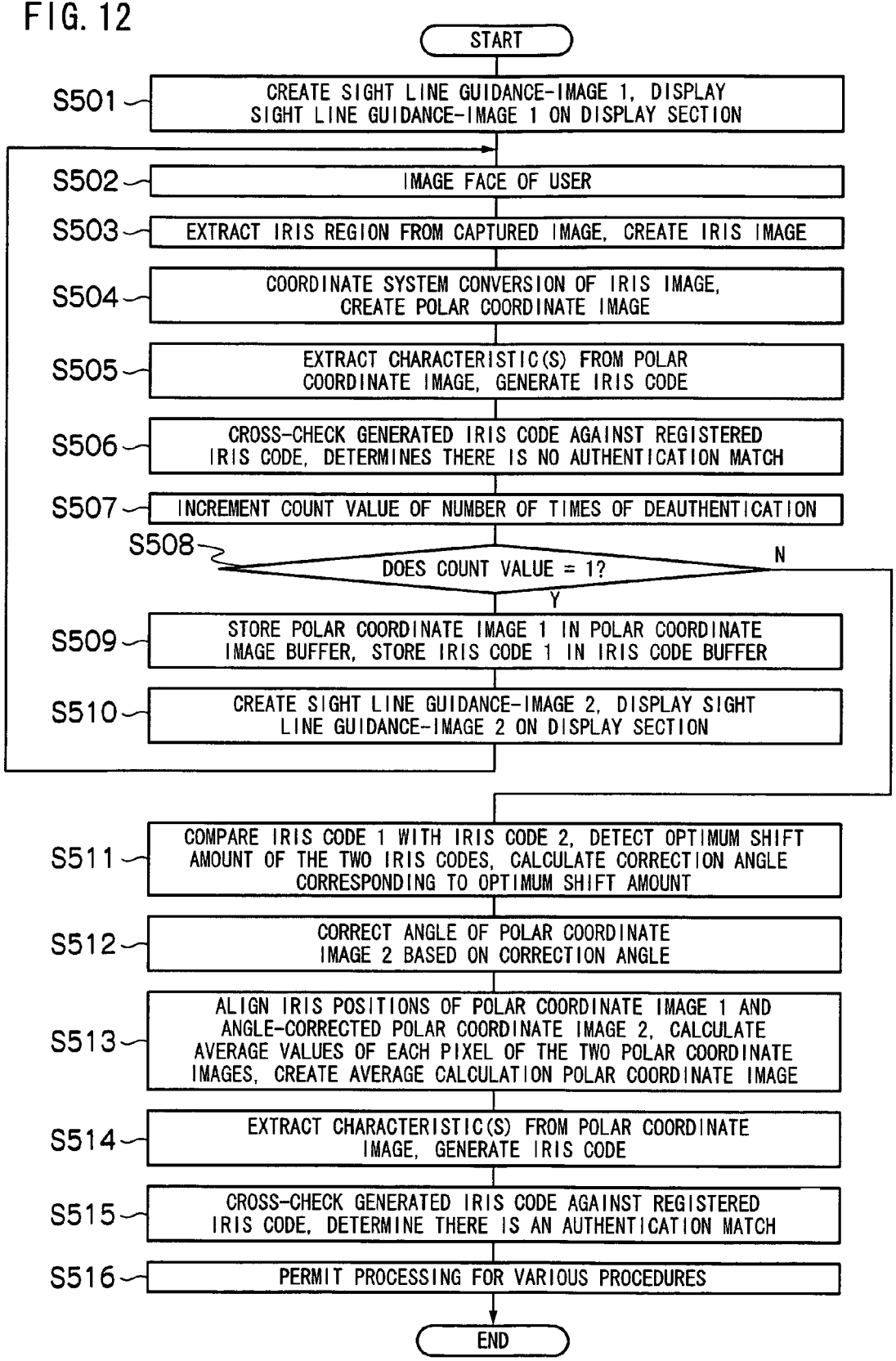
FIG. 12 is a flow chart showing the operation of a portable terminal of the fifth exemplary embodiment according to the present invention.

Explanation will now be given of the operation of the portable terminal 100d of the fifth exemplary embodiment according to the present invention, with reference to the flow chart shown in FIG. 12. An example will be given, in a similar manner to in the first exemplary embodiment, of the portable terminal 100d being a mobile phone, with judgment that there is no authentication match the first time and at retry-authentication, however, the person is authenticated as being the genuine person in authentication using the average calculation polar coordinate image, and payment is made using an electronic payment function of the portable terminal 100d.

When the user inputs a procedural instruction, for example "ELECTRONIC PAYMENT", using input button(s) provided at the input section 104 of the portable terminal 100d, the control section 101d instructs the sight line guidance-image creating section 120 to create a screen for imaging.

When in receipt of an instruction to create a screen for imaging, the sight line guidance-image creating section 120 acquires from the sight line guidance icon storage section 119 an icon for sight line guidance 1 for use in imaging the first time, configured for example by a circle and a left facing arrow. The sight line guidance-image creating section 120 also acquires sight line guidance imaging instruction information, stored in advance in a non-illustrated memory, for use in the first time of imaging in order to direct the sight line of the user toward the left of the screen, and creates a sight line guidance-image 1 based on the icon for sight line guidance 1 and the sight line guidance imaging instruction information.

When the sight line guidance-image creating section 120 has created the above sight line guidance-image 1, the control section 101d displays, on the display provided at the display section 102, a message such as for example "LOOK AT THE CIRCLE ON THE LEFT" and the sight line guidance-image 1 configured from a circle for focusing the sight line and an arrow for guiding the sight line toward the left (step S501).

The user then, with reference to the above sight line guidance-image 1 displayed on the display section 102, presses the imaging button provided at the input section 104 while looking into the camera provided at the imaging section 105, and the control section 101d instructs the imaging section 105 to capture an image.

Operation of steps S502 to S505 of the fifth exemplary embodiment is the same as the operation of steps S102 to S105 of the first exemplary embodiment.

When in receipt of an instruction to carry out iris authentication determining, the iris authentication determining section 110 cross-checks the iris code 1 held in the temporary storage section 103 against the registered iris code held in the registered iris code storage section 109, and determines whether there is, or is not, a match.

When the iris authentication determining section 110 has determined that there is no match (step S506), the control section 101d instructs the deauthentication counting section 111 to increment the count value.

When in receipt of an instruction to increment, the deauthentication counting section 111 increments the count value of the number of times of deauthentication, making the count value=1 (step S507).

If the count value of the deauthentication counting section 111 is 1 (step S508) then the control section 101d stores the polar coordinate image 1 held in the temporary storage section 103 in the polar coordinate image buffer 112 and also stores the iris code 1 held in the temporary storage section 103 in the iris code buffer 113 (step S509).

The control section 101d stores the polar coordinate image 1 and the iris code 1 in the polar coordinate image buffer 112 and the iris code buffer 113, and also instructs the sight line guidance-image creating section 120 to create a screen for retry-imaging for displaying an icon for sight line guidance on the display provided at the display section 102, in order to guide the sight line of the user so that the sight line is different from that during the first time of imaging.

When in receipt of an instruction to create a screen for retry-imaging, the sight line guidance-image creating section 120 acquires from the sight line guidance icon storage section 119 an icon for sight line guidance 2 for use in imaging the second time, configured for example as a diamond and a right facing arrow. The sight line guidance-image creating section 120 also acquires retry sight line guidance imaging instruction information, stored in advance in a non-illustrated memory, for use in the second time of imaging in order to direct the sight line of the user toward the right of the screen, and creates a sight line guidance-image 2 based on the icon for sight line guidance 2 and the retry sight line guidance imaging instruction information.

When the sight line guidance-image creating section 120 has created the sight line guidance-image 2 the control section 101d displays, on the display provided at the display section 102, a message such as for example "LOOK AT THE DIAMOND ON THE RIGHT" and the sight line guidance-image 2 configured from a diamond for focusing the sight line and an arrow for guiding the sight line toward the right (step S510).

When the user, with reference to the above retry-authentication instruction message information displayed on the display provided at the display section 102, carries out imaging for retry-authentication, the operation of steps S502 to S505 are carried out in the same manner as during initial authentication, the polar coordinate image creating section 107 creates a polar coordinate image 2, the iris code generating section 108 generates an iris code 2, and the iris authentication determining section 110 compares the current iris code 2 with the registered iris code held in the registered iris code storage section 109, and determines whether the two iris codes match or do not match.

If the iris authentication determining section 110 determines that there is no match (step S506), then the control section 101d instructs the deauthentication counting section 111 to increment the count value.

When in receipt of an instruction to increment, the deauthentication counting section 111 increments the count value of the number of times of deauthentication, making the count value=2 (step S507).

If the count value of the deauthentication counting section 111 is 2 (step S508), then the control section 101d instructs the average calculation polar coordinate image creating section 114 to create a polar coordinate image.

Operations of steps S511 to S516 of the fifth exemplary embodiment are the same as the operations of steps S111 to S116 of the first exemplary embodiment <Effect of the Fifth Exemplary Embodiment>

According to the personal authentication device of the fifth exemplary embodiment, by displaying the sight line guidance-image created by the sight line guidance-image creating section 120 on the display provided at the display section 102, with user reference to the sight line guidance-image the user's sight line direction is made different each time of imaging, and images can be obtained with different light reflection positions in the eye without changing the direction of the body of the user for each time of imaging.

It should be noted that, the configuration of the personal authentication device in the present exemplary embodiments the iris images are converted into polar system coordinates, however the iris images may be converted using a conversion Expression other than polar coordinate system conversion.

In the present exemplary embodiments the personal authentication device is also configured only to undertake retry-authentication a single time, however configuration may be made such that the retry-authentication is carried out in plural times.

In the above configuration, the polar coordinate image buffer 112 holds plural polar coordinate images, the iris code buffer 113 holds plural iris code buffers, and the optimum shift amount buffer 116 holds plural optimum shift amounts.

In the above configuration, the average calculation polar coordinate image creating section 114 then creates an average calculation polar coordinate image using the plural polar coordinate images.

In the fourth exemplary embodiment, functionality for registering a registered iris code is added to the configuration of the personal authentication device of the first exemplary embodiment, and this functionality may also be added to the configuration of the personal authentication devices of the second, third and fifth exemplary embodiments.

In the fifth exemplary embodiment functionality for guiding the sight line of the user is added to the configuration of the personal authentication device of the first exemplary embodiment, however, this functionality may also be added to the configuration of the personal authentication devices of the second, third and fourth exemplary embodiments.

Also, the fifth exemplary embodiment creates a sight line guidance-image using an icon for sight line guidance in order to guide the sight line of the user, and the image is displayed on the display provided at the display section 102 of the portable terminal 100d. However, configuration may be made with the display section 102 configured with light emitting devices such as from LEDs (Light Emitting Diodes), and by causing light to be emitted from a sight line guidance icon section.

INDUSTRIAL APPLICABILITY

Explanation has been given in the above described exemplary embodiments of examples of the personal authentication device as a mobile phone, however there is no limitation thereto, and any portable terminal such as, for example, a notebook PC provided with a camera, may be used.

EXPLANATION OF THE REFERENCE NUMERALS

100 PORTABLE TERMINAL
101 CONTROL SECTION
102 DISPLAY SECTION
103 TEMPORARY STORAGE SECTION
104 INPUT SECTION
105 IMAGING SECTION
106 IRIS IMAGE CREATING SECTION
107 POLAR COORDINATE IMAGE CREATING SECTION
108 IRIS CODE GENERATING SECTION
109 REGISTERED IRIS CODE STORAGE SECTION
110 IRIS AUTHENTICATION DETERMINING SECTION
111 DEAUTHENTICATION COUNTING SECTION
112 POLAR COORDINATE IMAGE BUFFER
113 IRIS CODE BUFFER
114 AVERAGE CALCULATION POLAR COORDINATE IMAGE CREATING SECTION
1141 CORRECTION ANGLE CALCULATION BLOCK
1142 POLAR COORDINATE IMAGE ANGLE CORRECTION BLOCK
1143 POLAR COORDINATE IMAGE TREND REMOVAL BLOCK
1144 CORRELATION FUNCTION USE-CORRECTION ANGLE CALCULATION BLOCK
115 OPTIMUM SHIFT AMOUNT DETECTION SECTION
116 OPTIMUM SHIFT AMOUNT BUFFER
117 IRIS CODE GENERATION TIMES COUNTING SECTION
118 REGISTERED IRIS CODE MANAGEMENT SECTION
119 SIGHT LINE GUIDANCE ICON STORAGE SECTION
120 SIGHT LINE GUIDANCE-IMAGE CREATING SECTION

The invention claimed is:

1. A personal authentication device, comprising:
an imaging section for imaging an eye of a user to capture an eye image including the iris thereof;
an iris image creating section for creating an iris image by extracting an image within a region of the iris from the captured eye image;
an iris code generating section for generating an iris code by calculating a characteristic value of the created iris image;
a determining section for comparing the created iris code with a registered iris code stored in advance in a storage section and determining whether the iris code matches or does not match the registered iris code;
a control section for giving an instruction to the imaging section to retry imaging when the determining section determines that the determining section determines that there is no match;
a correction angle calculation section, responsive to a determination of no match by the determining section, and to receipt of another iris code generated by the iris-code generating section from another iris image created by the iris image creating section from another eye image captured by the imaging section during a retry imaging instructed by the control section, for comparing the another iris code with the iris code generated from the previously captured image, detecting a shift amount representing a position at which a maximum proportion of the iris code generated from the previously captured image and the another iris code match, and calculating a correction angle for the another iris image corresponding to the detected shift amount;
an image angle correction section for correcting an angle of the another iris image based on the calculated correction angle;
an average calculation image creating section for computing average values for respective pixels of the two iris images after the angle correction and creating an average calculation image; and an iris code generation instruction section for instructing the iris code generating section to generate an iris code from the created average calculation image.

2. The personal authentication device of claim 1, wherein the control section instructs the imaging section to undertake retry-imaging a set number of times set in advance.

3. The personal authentication device of claim 1, wherein the control section, when in receipt of an instruction to register an iris code from a user, instructs the imaging section to carry out imaging a plurality of times, the device further comprising:

an average calculation image creation instruction section for instructing the average calculation image creating section to create an average calculation image from the plurality of captured images; and a storage section for, when an iris code is generated from the average calculation image, storing the generated iris code in the storage section.

4. The personal authentication device of claim 1, wherein the control section instructs the imaging section to undertake imaging a set number of times set in advance.

5. A personal authentication method comprising:

imaging an eye of a user including the iris of the eye with an imaging section;

creating an iris image by extracting an image within a region of the iris from the captured image;

generating an iris code by calculating a characteristic value of the created iris image;

comparing the generated iris code with a registered iris code;

determining whether the iris code matches or does not match the registered code;

when it is determined there is no match, instructing the imaging section to carry out retry-imaging, and when another iris code generated from another iris image created during the retry-imaging does not match the registered iris code, comparing the another iris code with the iris code generated from the previously captured image, detecting a shift amount representing a position at which a maximum proportion of the iris code and the another iris code match, and calculating a correction angle for the another iris image corresponding to the detected shift amount;

correcting an angle of the another iris image based on the calculated correction angle;

computing average pixel values for respective pixels of two iris images after the angle correction;

creating an average calculation image and instructing generation of an iris code from the created average calculation image.

6. The personal authentication method of claim 5, further comprising instructing the imaging section to undertake retry-imaging a set number of times set in advance.

7. The personal authentication method of claim 5, further comprising:

instructing the imaging section to carry out imaging a plurality of times when receiving an instruction to register the iris code from a user;

instructing to create the average calculation image from the plurality of captured images; and storing, by a storage section, the generated iris code in the storage section.

8. The personal authentication method of claim 5, further comprising instructing the imaging section to undertake imaging a set number of times set in advance.

* * * * *